United States Patent
Hara et al.

(10) Patent No.: US 8,749,688 B2
(45) Date of Patent: Jun. 10, 2014

(54) PORTABLE DEVICE, OPERATING METHOD, AND COMPUTER-READABLE STORAGE MEDIUM

(75) Inventors: Satoshi Hara, Hino (JP); Akira Tani, Sagamihara (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 194 days.

(21) Appl. No.: 13/357,234

(22) Filed: Jan. 24, 2012

(65) Prior Publication Data

US 2012/0200721 A1    Aug. 9, 2012

(30) Foreign Application Priority Data

Feb. 9, 2011   (JP) .................................. 2011-026292
Feb. 21, 2011  (JP) .................................. 2011-035101

(51) Int. Cl.
*H04N 5/228*    (2006.01)
*H04N 5/222*    (2006.01)

(52) U.S. Cl.
USPC .................................. 348/333.01; 348/208.16

(58) Field of Classification Search
USPC ............. 348/208.12, 208.15, 208.16, 333.01, 348/333.02, 333.04
See application file for complete search history.

(56) References Cited

U.S. PATENT DOCUMENTS

| | | | |
|---|---|---|---|
| 8,085,138 B2 * | 12/2011 | Sawada ......................... | 340/435 |
| 2008/0143890 A1 * | 6/2008 | Rosencwaig et al. ......... | 348/836 |
| 2012/0200721 A1 * | 8/2012 | Hara et al. ................. | 348/208.4 |
| 2012/0289217 A1 * | 11/2012 | Riemer et al. ................ | 455/418 |

FOREIGN PATENT DOCUMENTS

| | | |
|---|---|---|
| JP | 09-149311 | 6/1997 |
| JP | 2008-268726 | 11/2008 |

* cited by examiner

*Primary Examiner* — Timothy J Henn
(74) *Attorney, Agent, or Firm* — John C. Pokotylo; Straub & Pokotylo

(57) ABSTRACT

A portable device includes an imaging unit that captures an image of an object and generates image data of the object, a display unit that displays an image of the image data, an input unit that receives input of an operation instruction on an operation performed by the portable device, a moving-state determining unit that determines a moving state of the portable device when the potable device captures an image, and a control unit that changes a content of the operation instruction received by the input unit, depending on a determination result of the moving-state determining unit.

21 Claims, 25 Drawing Sheets

FIG.24
(a)
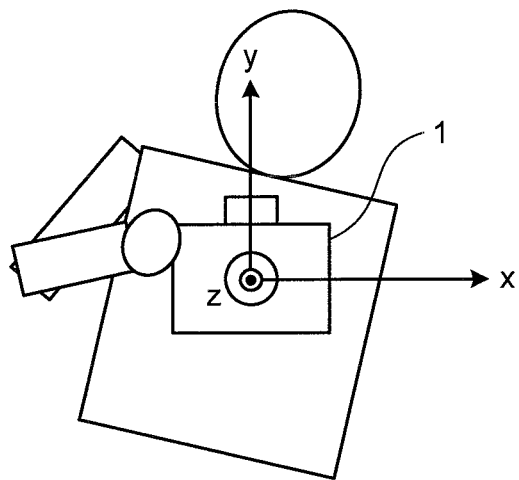
(b)
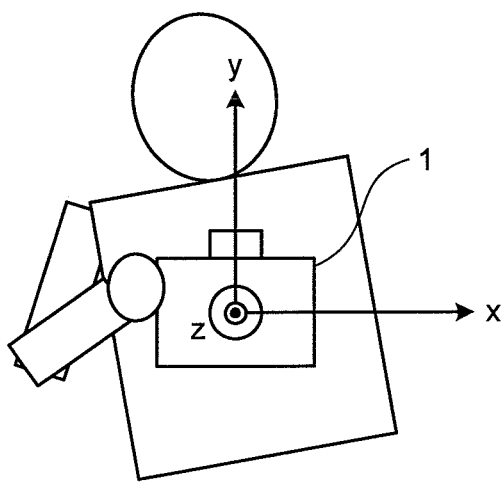

PORTABLE DEVICE, OPERATING METHOD, AND COMPUTER-READABLE STORAGE MEDIUM

CROSS REFERENCE TO RELATED APPLICATIONS

This application is based upon and claims the benefit of priority from Japanese Patent Application No. 2011-026292, filed on Feb. 9, 2011 and Japanese Patent Application No. 2011-035101, filed on Feb. 21, 2011, the entire contents of which are incorporated herein by reference.

BACKGROUND OF THE INVENTION

1. Field of the Invention

The present invention relates to a portable device that captures an image of an object and generates electronic image data, and relates to an operating method and a computer-readable storage medium.

2. Description of the Related Art

Recently, in portable devices, such as digital cameras or portable phones equipped with shooting functions, there has been a technology for an automatic zoom function of maintaining a constant angle of view so that the size of an object can be maintained constant regardless of whether the object goes away from or comes close to the potable devices (see Japanese Laid-open Patent Publication No. H9-149311).

SUMMARY OF THE INVENTION

A portable device according to an aspect of the present invention includes: an imaging unit that captures an image of an object and generates image data of the object; a display unit that displays an image of the image data; an input unit that receives input of an operation instruction on an operation performed by the portable device; a moving-state determining unit that determines a moving state of the potable device when the portable device captures an image; and a control unit that changes a content of the operation instruction received by the input unit, depending on a determination result of the moving-state determining unit.

An operating method according to another aspect of the present invention implemented by a portable device, which has an imaging unit that captures an image of an object and generates image data of the object and a display unit that displays an image of the image data, includes: receiving input of an operation instruction on an operation performed by the portable device; determining a moving state of the portable device when the portable device performs captures an image; and changing a content of the operation instruction received at the receiving, depending on a determination result obtained at the determining.

A non-transitory computer-readable storage medium according to still another aspect of the present invention has an executable program stored thereon, wherein the program instructs a processor to perform: receiving input of an operation instruction on an operation performed by the portable device; determining a moving state of the portable device when the portable device performs captures an image; and changing a content of the operation instruction received at the receiving, depending on a determination result obtained at the determining.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 24 is a schematic diagram illustrating a change in the state of the front face when viewed from the object side in the situation illustrated in FIG. 23;

DETAILED DESCRIPTION OF THE PREFERRED EMBODIMENTS

Figure 1:
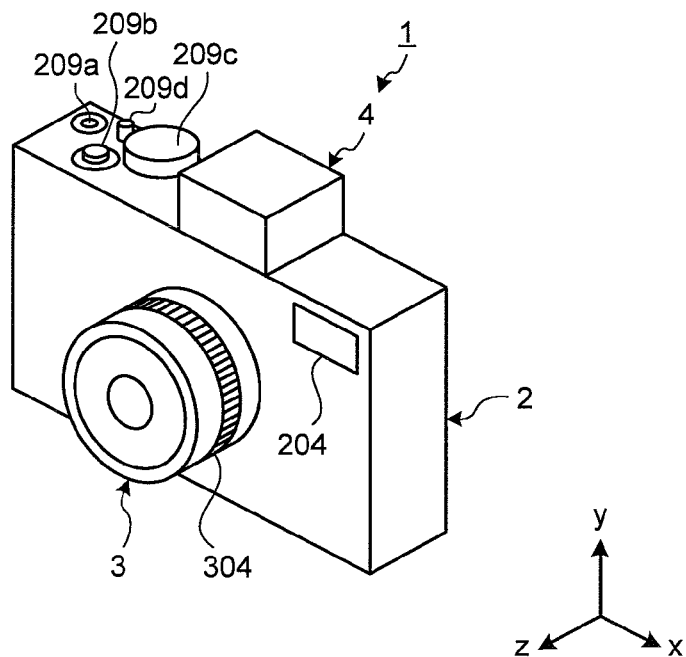
FIG. 1 is a perspective view of a configuration of an imaging device on an object-facing side according to a first embodiment of the present invention.

Exemplary embodiments (hereinafter, described as "embodiments") of the present invention will be explained in detail below with reference to the accompanying drawings. In the following explanation, an imaging device, such as a digital single-lens reflex camera, will be described as an example of a portable device of the present invention. However, the present invention is not limited by the following embodiments. In the drawings, the same components are denoted by the same reference numerals.

First Embodiment

Figure 2:
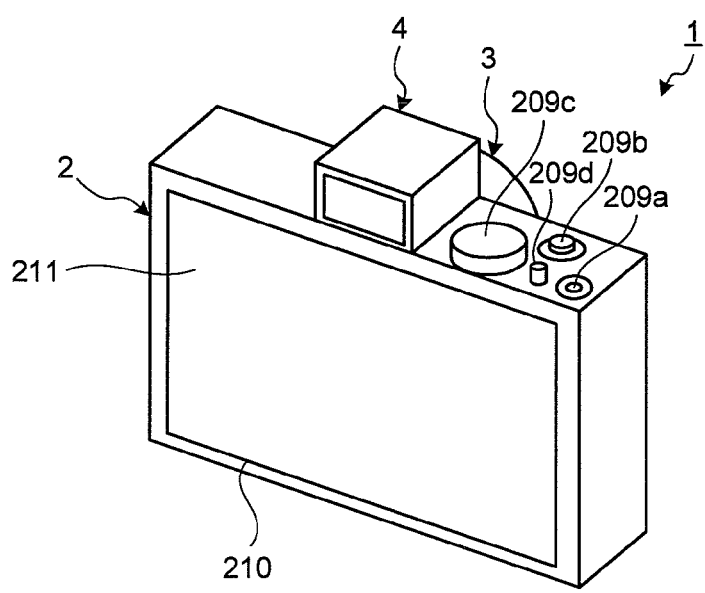
FIG. 2 is a perspective view of a configuration of the imaging device on a user-facing side according to the first embodiment of the present invention.
Figure 3:
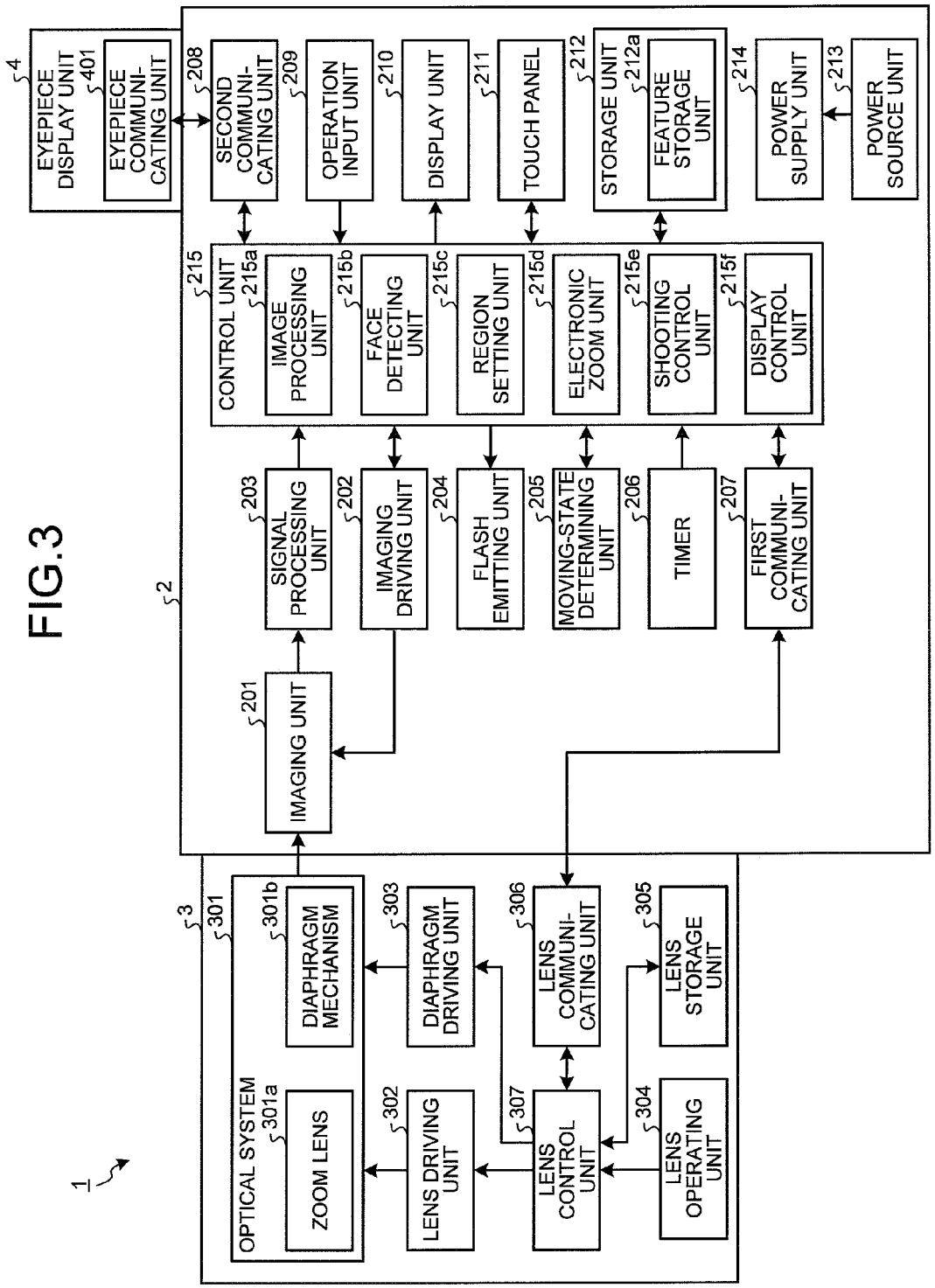
FIG. 3 is a block diagram of the configuration of the imaging device according to the first embodiment of the present invention.

FIG. 1 is a perspective view of a configuration of an imaging device on an object-facing side (front side) according to a first embodiment of the present invention. FIG. 2 is a perspective view of a configuration of the imaging device on a user-facing side (back side) according to the first embodiment of the present invention. FIG. 3 is a block diagram of the configuration of the imaging device according to the first embodiment of the present invention. An imaging device 1 illustrated in FIGS. 1 to 3 includes a main body unit 2, a lens unit 3 that is detachably attached to the main body unit 2, and an eyepiece display unit (an electronic viewfinder) 4 that is detachably attached to the main body unit 2.

As illustrated in FIGS. 1 to 3, the main body unit 2 includes an imaging unit 201, an imaging driving unit 202, a signal processing unit 203, a flash emitting unit 204, a moving-state determining unit 205, a timer 206, a first communicating unit 207, a second communicating unit 208, an operation input unit 209, a display unit 210, a touch panel 211, a storage unit 212, a power source unit 213, a power supply unit 214, and a control unit 215.

The imaging unit 201 includes an imaging element, such as a charge coupled device (CCD) or a complementary metal oxide semiconductor (CMOS), that receives light condensed by the lens unit 3 and converts the light to an electrical signal; and a shutter.

The imaging driving unit 202 has a function of driving the imaging element and the shutter in accordance with a release signal. For example, the imaging driving unit 202 causes the imaging element of the imaging unit 201 to output image data (an analog signal) to the signal processing unit 203 at a predetermined timing.

The signal processing unit 203 performs signal processing, such as amplification, on the analog signal output from the imaging unit 201 and thereafter performs analog-to-digital (A/D) conversion to generate and output digital image data.

The flash emitting unit 204 includes a xenon lamp or a light emitting diode (LED). The flash emitting unit 204 emits stroboscopic light, as fill light, toward a visual field region to be captured by the imaging device 1.

Figure 4:
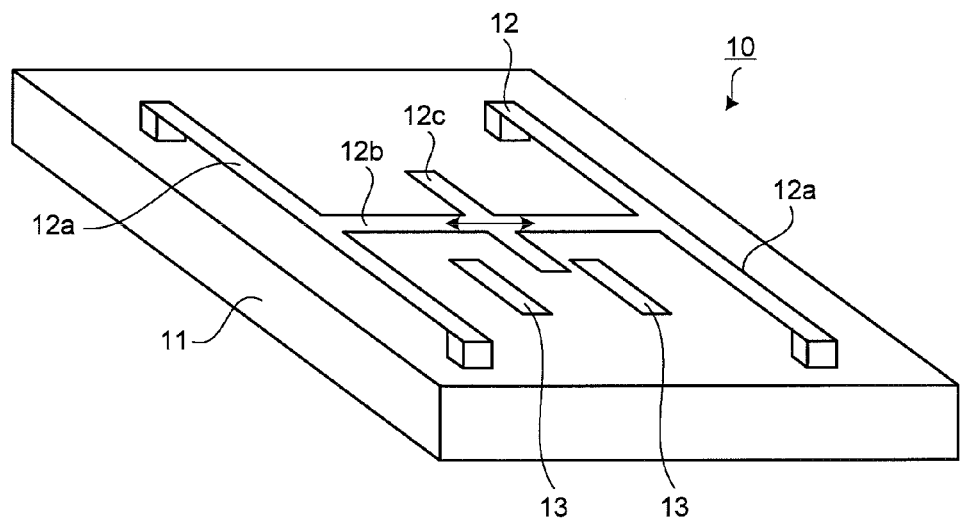
FIG. 4 is a diagram of a configuration of an acceleration sensor forming a part of a moving-state determining unit in the imaging device according to the first embodiment of the present invention.

FIG. 4 is a diagram of a configuration of an acceleration sensor forming a part of the moving-state determining unit 205. An acceleration sensor 10 illustrated in FIG. 4 is a capacitance type acceleration sensor formed by a micro electro mechanical systems (MEMS) process. The acceleration sensor 10 includes a metallic movable portion 12 having a beam structure, in which a bridge is provided and end portions are fixed in the vicinity of four corners of a principal plane of a chip 11 that has a rectangular solid shape; and two metallic plate portions 13 arranged on the principal plane of the chip 11, on which the end portions of the movable portion 12 are fixed. The movable portion 12 includes two band-shaped extended portions 12a extending in the same direction on the principal plane of the chip 11; a band-shaped connection portion 12b that connects central portions of the two extended portions 12a to each other along a direction perpendicular to the direction in which the extended portions 12a extend; and a band-shaped protrusion 12c that protrudes from a central portion of the connection portion 12b in a direction parallel to the direction in which the extended portions 12a extend.

In the acceleration sensor 10 having the above configuration, when acceleration in a left-right direction (a direction of arrow) in FIG. 4 is applied, the movable portion 12 except for the end portions of the extended portions 12a is bent and deformed in the left-right direction. Therefore, the positional relation between the protrusion 12c and the plate portions 13 changes, changing the capacitance. The acceleration sensor 10 outputs a signal (voltage) based on the change in the capacitance.

Figure 5:
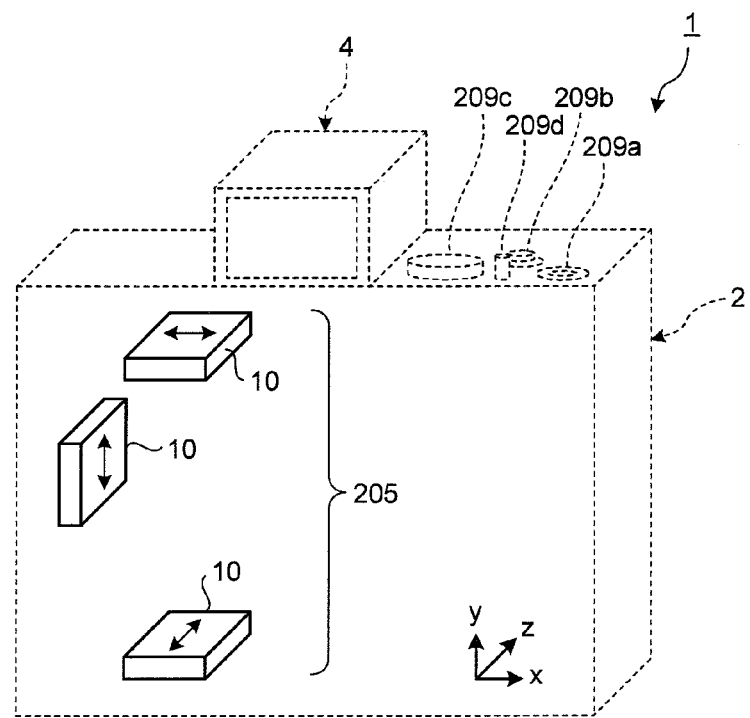
FIG. 5 is a schematic diagram of a configuration of the moving-state determining unit in the imaging device according to the first embodiment of the present invention.

FIG. 5 is a schematic diagram of the configuration of the moving-state determining unit 205 in the imaging device 1. As illustrated in FIG. 5, the moving-state determining unit 205 includes three acceleration sensors 10 whose acceleration directions are perpendicular to one another. Specifically, a coordinate system specific to the imaging device 1 is provided, in which x-axis is parallel to the width direction of the imaging device 1, y-axis is parallel to the vertical direction of the imaging device 1, and z-axis is parallel to an optical axis of the imaging device 1, and the three acceleration sensors 10 for detecting acceleration components in the respective axis directions are placed at predetermined positions on the main body unit 2 of the imaging device 1.

With the moving-state determining unit 205 having the above configuration, when a user moves the imaging device 1 toward an object side (in the z direction), it is possible to accurately detect acceleration caused by the movement. It is also possible to detect a tracking state, in which a user tracks an object while using the imaging device 1. When the lateral direction of an image displayed on the display unit 210 is approximately the same as the horizontal direction of the imaging device 1, the moving-state determining unit 205 determines that the imaging device 1 is being moved. The moving-state determining unit 205 may be used for detecting hand shake or correcting images on the basis of detected hand shake.

Figure 6:
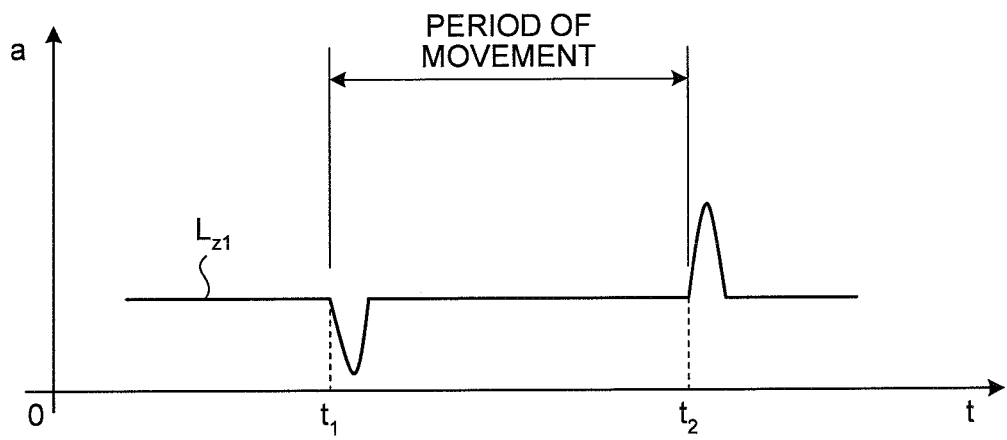
FIG. 6 is a diagram illustrating a temporal change in the magnitude of acceleration detected by the acceleration sensor forming a part of the moving-state determining unit, when the imaging device according to the first embodiment of the present invention is moved toward an object.

FIG. 6 is a diagram illustrating a temporal change in the magnitude of acceleration detected by the acceleration sensor 10 forming a part of the moving-state determining unit 205, when the imaging device 1 is moved toward an object. In FIG. 6, a curved line $L_{z1}$ represents a temporal change in the acceleration in the z-axis direction (see FIG. 5) of the imaging device 1. In FIG. 6, the horizontal axis represents time t and the vertical axis represents the magnitude a of the acceleration detected by the acceleration sensor 10. In FIG. 6, the acceleration in the direction in which the imaging device 1 is moved toward an object is represented by positive values.

As illustrated in FIG. 6, when a user starts moving the imaging device 1 toward the object side at time $t_1$ and stops the movement of the imaging device 1 at time $t_2$, a temporal change in the magnitude of the acceleration in the z-axis direction of the imaging device 1 is represented as a pulse (see the curved line $L_{z1}$). Thus, when the imaging device 1 is moved, the moving-state determining unit 205 can detect the movement of the imaging device 1 in accordance with a change in the acceleration.

The timer 206 has a timer function and a shooting date/time determination function. The timer 206 outputs date/time data to the control unit 215 to add the date/time data to image data of a captured image.

The first communicating unit 207 is a communication interface for communicating with the lens unit 3 attached to the main body unit 2. The second communicating unit 208 is a communication interface for communicating with the eyepiece display unit 4 attached to the main body unit 2. The second communicating unit 208 can also communicate with an accessory, such as an electronic flash or a microphone, attached to the main body unit 2.

As illustrated in FIGS. 1 and 2, the operation input unit 209 includes a power switch 209a for switching the state of a power supply to the imaging device 1 to an ON state or to an OFF state; a release switch 209b for inputting a still image release signal to give an instruction to capture a still image; a shooting mode switching switch 209c for inputting a switching signal to give an instruction to switch between various shooting modes set in the imaging device 1; and a display switching switch 209d for inputting a switching signal to give an instruction to switch a display destination for displaying a live view image to the display unit 210 or to the eyepiece display unit 4.

The display unit 210 is realized by a display panel formed of liquid crystal, organic electro luminescence (EL), or the like. The display unit 210 displays a landscape-oriented image corresponding to image data. The display unit 210 displays information related to operation instructions of the imaging device 1 or shooting information related to shooting.

The touch panel 211 is arranged on a display screen of the display unit 210. The touch panel 211 detects a position that a user has contacted on the basis of information displayed on the display unit 210, and receives input of an operation instruction on an operation performed by the imaging device 1 in accordance with the detected contact position. A typical touch panel is of a resistive type, a capacitance type, or an optical type. In the first embodiment, a touch panel of any type is applicable.

The storage unit 212 is realized by a semiconductor memory, such as a flash memory or a dynamic random access memory, which is fixedly arranged inside the imaging device 1. The storage unit 212 stores therein various programs for operating the imaging device 1, a program according to the first embodiment, and various types of data and parameters used during execution of the program. The storage unit 212 includes a feature storage unit 212a for storing a feature portion of an object contained in image data. The storage unit 212 also stores therein image data, information on the lens unit 3 that is attachable to the main body unit 2, and correction information on image data corresponding to the type of the lens unit 3. The storage unit 212 may include a computer-readable storage medium, such as a memory card, that is externally attachable.

The power source unit 213 includes a battery that is detachably attached to the imaging device 1. The power supply unit 214 supplies power from the power source unit 213 to each component (including the attached lens unit 3 and the attached eyepiece display unit 4) of the imaging device 1. The power supply unit 214 may supply power supplied from an external power source (not illustrated) to each component of the imaging device 1.

The control unit 215 includes a central processing unit (CPU) or the like. The control unit 215 gives an instruction or transfers data to a corresponding unit of the imaging device 1 in accordance with an instruction signal or a switching signal received from the operation input unit 209 or the touch panel 211, to thereby integrally control the operation of the imaging device 1. The control unit 215 includes an image processing unit 215a, a face detecting unit 215b, a region setting unit 215c, an electronic zoom unit 215d, a shooting control unit 215e, and a display control unit 215f.

The image processing unit 215a performs various types of image processing on image data input from the signal processing unit 203 and outputs the image data to the storage unit 212. Specifically, the image processing unit 215a performs image processing involving at least edge enhancement, white balance, color correction, and γ correction on the image data.

The face detecting unit 215b detects a face of a person contained in an image corresponding to the image data by performing pattern matching. The face detecting unit 215b may detect a face of a dog or a cat in addition to a face of a person. The face detecting unit 215b may detect a face of a person by using known techniques other than the pattern matching.

When an instruction signal for giving an instruction on automatic zoom is input from the operation input unit 209 or the touch panel 211, the region setting unit 215c sets a fixed region, in which a size is maintained constant regardless of a distance between the imaging device 1 and an object, in an image displayed on the display unit 210. For example, the region setting unit 215c sets a region obtained by multiplying a face region of a person detected by the face detecting unit 215b by a predetermined coefficient (e.g., 1.5 times), as a region to be tracked by automatic zoom. The region setting unit 215c may set, as the fixed region, a region in which the lens unit 3 is in focus in an image displayed on the display unit 210.

The electronic zoom unit 215d trims off a portion of the image corresponding to the image data and enlarges the trimmed image. Specifically, the electronic zoom unit 215d trims off an image region in accordance with an instruction signal indicating a zoom factor input from the touch panel 211, and enlarges the trimmed image to realize electronic zoom.

When a still image release signal is input, the shooting control unit 215e causes the imaging device 1 to start a still image shooting operation. The still image shooting operation in the imaging device 1 is an operation in which the signal processing unit 203 and the image processing unit 215a perform predetermined processing on image data output by the imaging unit 201 driven by the imaging driving unit 202. The image data subjected to the processing is stored in the storage unit 212 by the shooting control unit 215e. The shooting control unit 215e changes the content of an operation instruction received by the touch panel 211 depending on the determination result of the moving-state determining unit 205. Specifically, when the moving-state determining unit 205 determines that the imaging device 1 is being moved, the shooting control unit 215e changes the content of an operation instruction received by the touch panel 211 from the content of a first operation instruction that a user can select in the initial state of the imaging device 1 to the content of a second operation instruction that the user can select in the moving state of the imaging device 1.

Furthermore, when the moving-state determining unit 205 determines that the imaging device 1 is being moved, the shooting control unit 215e sets a predetermined region, e.g., only a right region, as a region in which the touch panel 211 receives input. The initial state is a state in which the display unit 210 initially displays information related to an operation instruction in the shooting mode of the imaging device 1. The shooting control unit 215e changes the content of the operation instruction received by the touch panel 211. It is possible to change an association relation between an operation received by the display switching switch 209d and an operation performed by the imaging device 1.

When the imaging device 1 captures an image, the display control unit 215f displays, on the display unit 210, an icon representing information related to an operation instruction on an operation performed by the imaging device 1. When the imaging device 1 is being moved, the display control unit 215f displays an icon corresponding to the content of the second operation instruction in a region, e.g., a right region, in which the touch panel 211 can receive input on the display unit 210. The display control unit 215f superimposes a frame corresponding to a region containing a face of a person detected by the control unit 215 or a frame corresponding to a region in which the lens unit 3 is in focus onto an image, and displays the image on the display unit 210. The display control unit 215f displays an image corresponding to the image data generated by the imaging unit 201 on the display unit 210 and/or the eyepiece display unit 4 on the basis of the determination result of the moving-state determining unit 205. Specifically, when the moving-state determining unit 205 determines that the imaging device 1 is being moved, the display control unit 215f displays a live view image on the display unit 210. When the moving-state determining unit 205 determines that the imaging device 1 is not being moved, the display control unit 215f displays the live view image on the eyepiece display unit 4. The display control unit 215f changes the content of operation information related to the operation instruction on an operation performed by the imaging device 1, depending on the determination result of the moving-state determining unit 205, and displays the content on the display unit 210 and/or the eyepiece display unit 4. Specifically, when the moving-state determining unit 205 determines that the imaging device 1 is being moved, the display control unit 215f displays, on the display unit 210 and/or the eyepiece display unit 4, operation information related to an operation instruction received by the imaging device 1, as an icon corresponding to an operation instruction that a user can select while the imaging device 1 is being moved. When the display of the live view image is switched from the eyepiece display unit 4 to the display unit 210 or from the display unit 210 to the eyepiece display unit 4, the display control unit 215f displays, on the display unit 210 or the eyepiece display unit 4, switching information indicating that a display destination of the live view image is switched. The display control unit 215f also displays, on the display unit 210 or the eyepiece display unit 4, a time taken before the display of the live view image is switched.

The main body unit 2 having the above configuration may be equipped with an audio input-output function or a communication function of interactively communicating with an external personal computer (not illustrated) via the Internet.

The lens unit 3 includes an optical system 301, a lens driving unit 302, a diaphragm driving unit 303, a lens operating unit 304, a lens storage unit 305, a lens communicating unit 306, and a lens control unit 307.

The optical system 301 includes a single or plural lenses. The optical system 301 condenses light from a predetermined visual field region, and forms an image on the imaging unit 201 with the condensed light. The optical system 301 includes a zoom lens 301a that changes an angle of view of the optical system 301 by changing a focal length of the optical system 301; and a diaphragm mechanism 301b that adjusts exposure by limiting the amount of incident light condensed by the optical system 301.

The lens driving unit 302 includes a stepping motor, a DC motor, or the like. The lens driving unit 302 moves the lens of the optical system 301 on the optical axis to change a point of focus or a focal length of the optical system 301. Specifically, the lens driving unit 302 moves the zoom lens 301a along the optical axis to change the focal length of the optical system 301.

The diaphragm driving unit 303 includes a stepping motor or the like. The diaphragm driving unit 303 drives the diaphragm mechanism 301b to adjust the amount of light incident on the imaging unit 201.

The lens operating unit 304 is a zoom ring or a focusing ring arranged on the circumference of a lens barrel of the lens unit 3. The lens operating unit 304 receives a signal for operating the lens in the optical system 301. The lens operating unit 304 may be a push-type switch or the like.

The lens storage unit 305 stores therein, for example, a control program for determining the position or motion of the zoom lens 301a of the optical system 301. The lens storage unit 305 stores therein, for example, magnification, focal length, aberration, and F-number (the number indicating brightness) of the zoom lens 301a.

The lens communicating unit 306 is a communication interface for communicating with the first communicating unit 207 of the main body unit 2 when the lens unit 3 is attached to the main body unit 2.

The lens control unit 307 includes a central processing unit (CPU) or the like. The lens control unit 307 controls the operation of the lens unit 3 in accordance with an instruction signal received from the main body unit 2.

The eyepiece display unit 4 is realized by a display panel formed of liquid crystal, organic electro luminescence, or the like. The eyepiece display unit 4 displays a live view image corresponding to image data. The eyepiece display unit 4 superimposes an operation instructions or information related to a shooting condition onto the live view image displayed thereon. The eyepiece display unit 4 includes an eyepiece communicating unit 401 that communicates with the second communicating unit 208 of the main body unit 2 when the eyepiece display unit 4 is attached to the main body unit 2. The eyepiece display unit 4 functions as a second display unit.

Figure 7:
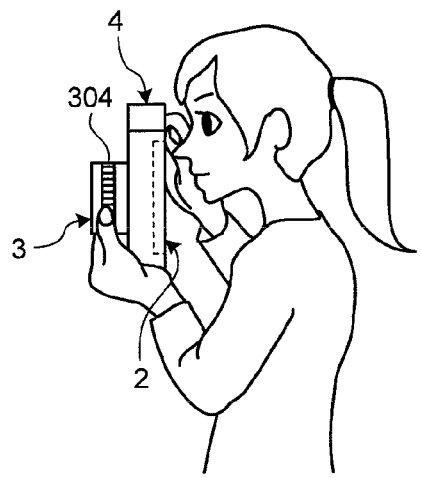
FIG. 7 is a schematic diagram illustrating an example of a situation in which an operation instruction can be easily input while an image is captured by using the imaging device according to the first embodiment of the present invention.
Figure 8:
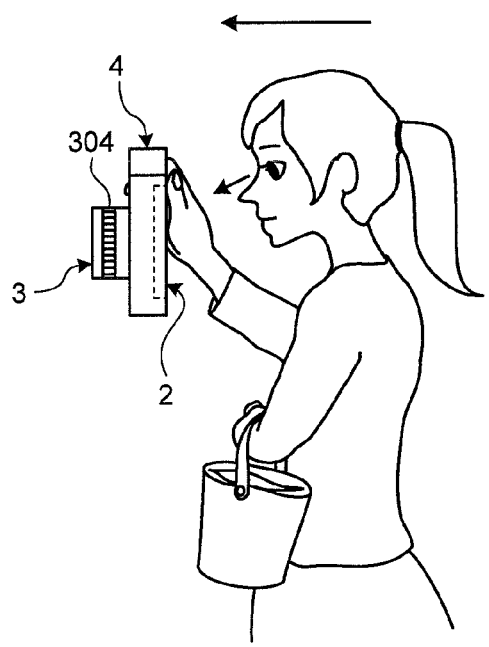
FIG. 8 is a schematic diagram illustrating an example of a situation in which it is difficult to input an operation instruction while an image is captured by using the imaging device according to the first embodiment of the present invention.
Figure 9:
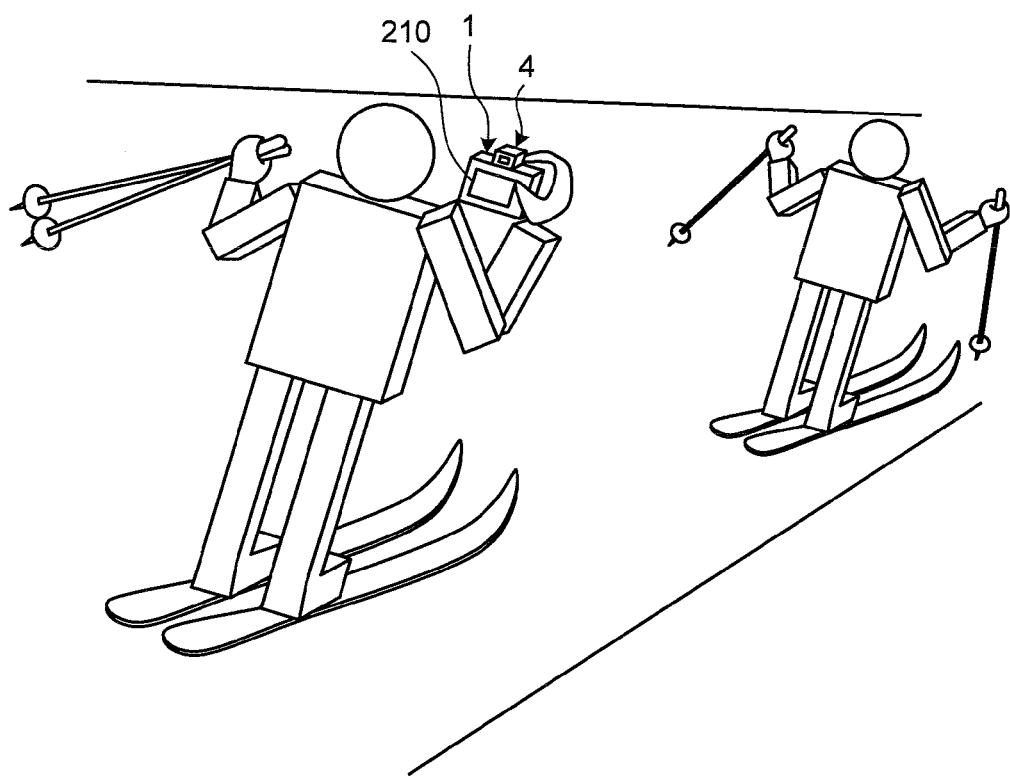
FIG. 9 is a schematic diagram illustrating another example of the situation in which it is difficult to input an operation instruction while an image is captured by using the imaging device according to the first embodiment of the present invention.

An explanation will be given of a situation in which it is difficult for a user to input an operation instruction when the user captures an image by using the imaging device 1 having the above configuration. FIG. 7 is a schematic diagram illustrating an example of a situation in which an operation instruction can be easily input when an image is captured by using the imaging device 1. FIG. 8 is a schematic diagram illustrating an example of a difficult situation in which it is difficult to input an operation instruction when an image is captured by using the imaging device 1. FIG. 9 is a schematic diagram illustrating another example of the situation in which it is difficult to input an operation instruction when an image is captured by using the imaging device 1.

As illustrated in FIG. 7, in the situation in which a user can easily input an operation instruction, e.g., in which the user captures an image while standing still, the user can place the right index finger on the release switch 209b while supporting the main body unit 2 by the right hand and can operate the lens operating unit 304 with the left thumb and the left middle finger while supporting the lens unit 3 by the left hand. The user can also determine a composition of an image to be captured by inputting a desired operation instruction, e.g., by performing a zoom operation for operating the lens operating unit 304, while looking into the eyepiece display unit 4.

By contrast, as illustrated in FIG. 8, in a situation in which a user can input an operation instruction by only the right hand like in a situation in which the user captures an image while walking carrying a baggage by the left hand, the user may be able to perform only a shooting operation of operating the release switch 209b. Furthermore, the user may be unable to look into the eyepiece display unit 4. In this case, the user needs to enlarge a visual field region by viewing the live view image displayed on the display unit 210.

As illustrated in FIG. 9, when, for example, a user tracks an object to capture an image while skiing, the user needs to keep balance in order not to fall on snow; therefore, the user may be forced to capture an image by one hand and may be unable to look into the eyepiece display unit 4.

Figure 10:
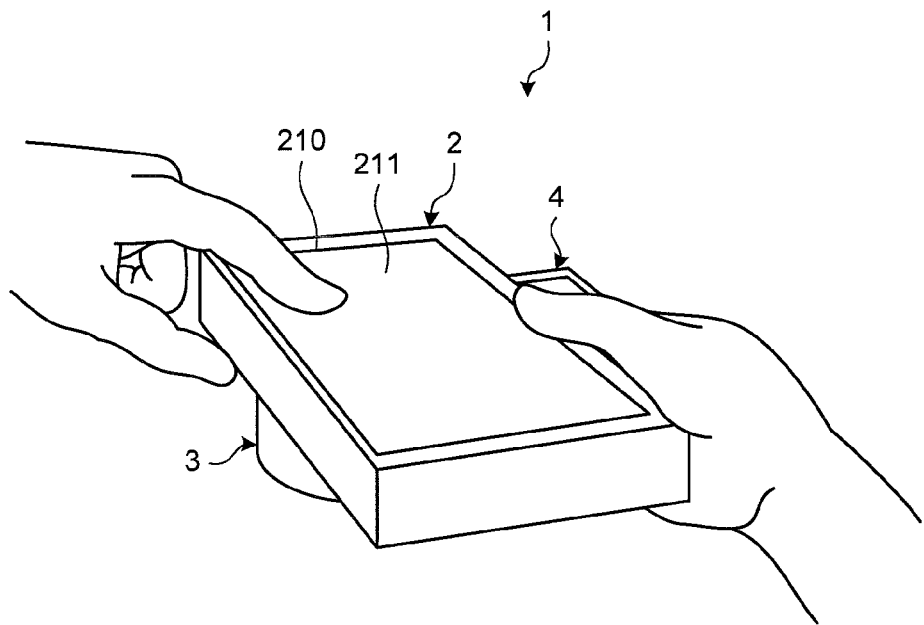
FIG. 10 is a schematic diagram illustrating an example of an operation-instruction input operation that is difficult for a user when the user captures an image in the situation illustrated in FIG. 8.
Figure 11:
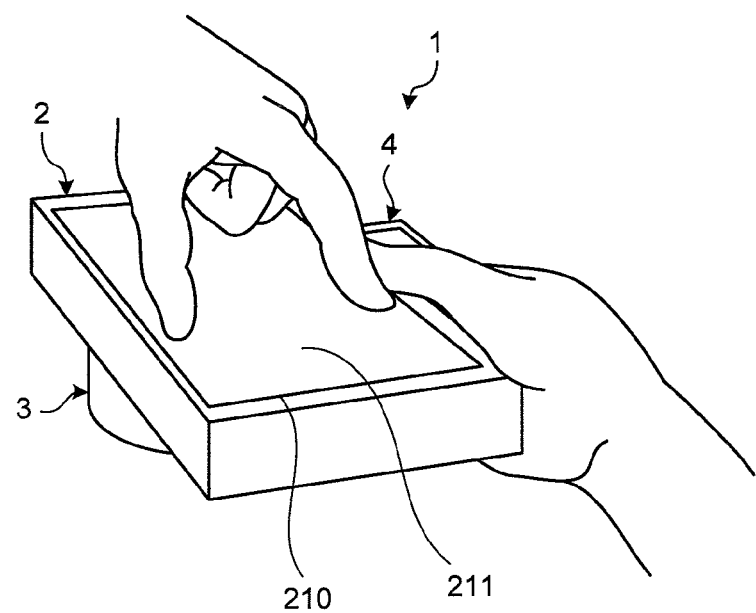
FIG. 11 is a schematic diagram illustrating another example of the operation-instruction input operation that is difficult for a user when the user captures an image in the situation illustrated in FIG. 8.
Figure 12:
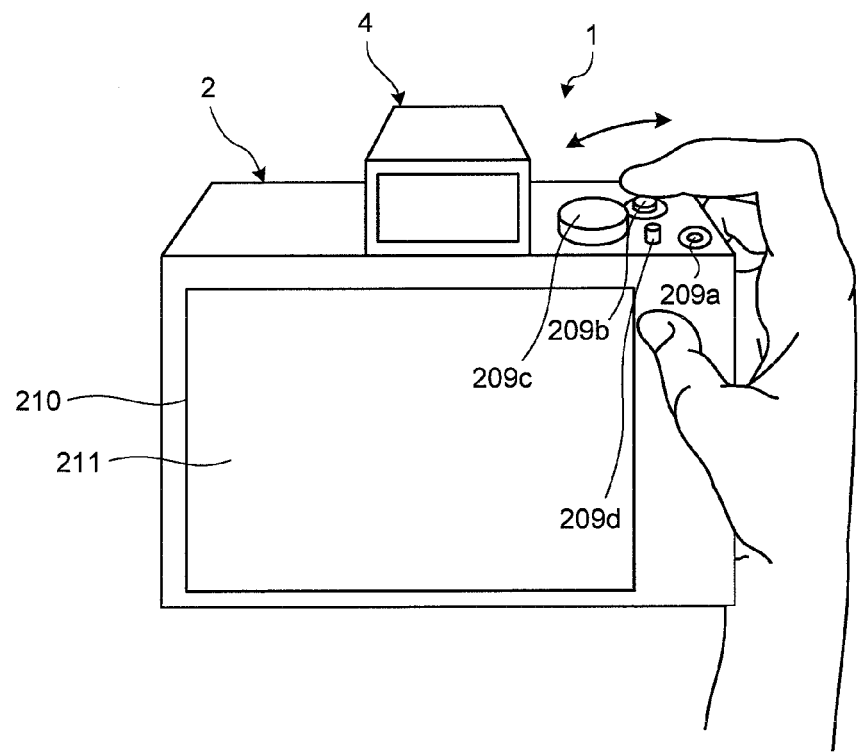
FIG. 12 is a schematic diagram illustrating still another example of the operation-instruction input operation that is difficult for a user when the user captures an image in the situation illustrated in FIG. 8.
Figure 13:
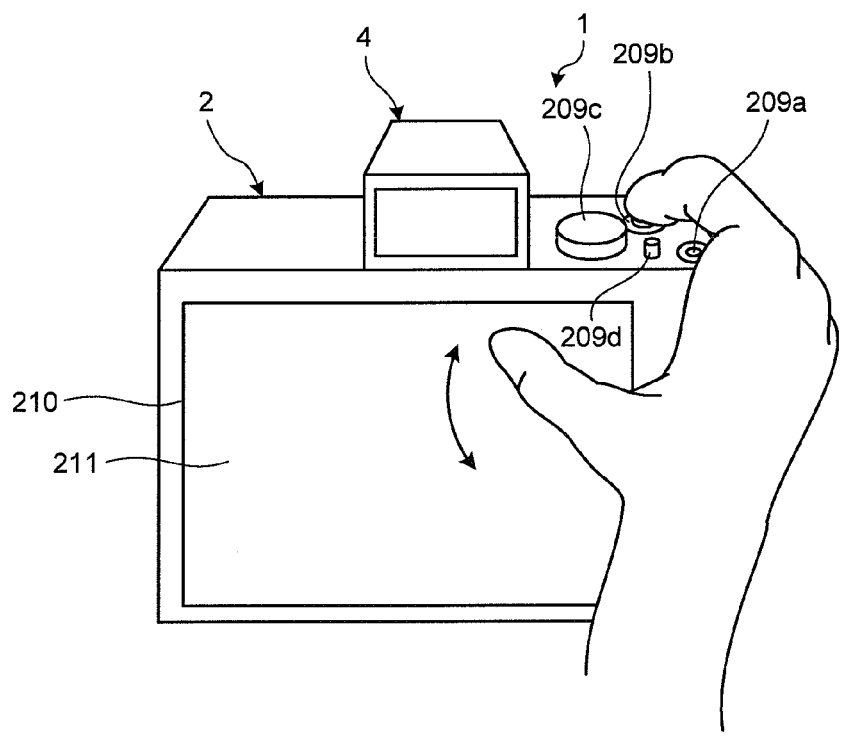
FIG. 13 is a schematic diagram illustrating an example of an operation-instruction input operation that is possible for a user when the user captures an image in the situation illustrated in FIG. 8.

An explanation will be given of an operation-instruction input operation that is difficult for a user when the user captures an image by using the imaging device 1 in the situations as described above. FIGS. 10 to 12 are schematic diagrams illustrating an example of the operation-instruction input operation that is difficult for a user when the user captures an image in the situation illustrated in FIG. 8. FIG. 13 is a schematic diagram illustrating another example of an operation-instruction input operation that is possible for a user when the user captures an image in the situation illustrated in FIG. 8.

As illustrated in FIGS. 10 and 11, it is extremely difficult for a user to perform a touch operation, in which the user supports the imaging device 1 by the right hand and touches the touch panel 211 by the left hand, or a multi-touch operation, in which the user touches a plurality of portions on the touch panel 211 to enlarge a display, when the user captures an image while walking. As illustrated in FIG. 12, in the situation in which the user is ready to press the release switch 209b with the right index finger at any time in order not to miss the best shot of an object, it is extremely difficult for the user to perform the switching operation of operating the shooting mode switching switch 209c or the zoom operation that requires the user to switch the gaze from the display unit 210.

By contrast, as illustrated in FIG. 13, in the situation in which the user is ready to press the release switch 209b with the right index finger at any time, the user can perform a touch operation or a slide operation on the touch panel 211 with the right thumb. Therefore, in the first embodiment, the shooting control unit 215e changes a region where the touch panel 211 receives input, depending on the determination result of the moving-state determining unit 205. Specifically, when the moving-state determining unit 205 determines that the imaging device 1 is being moved, the shooting control unit 215e sets only a right region as a region where the touch panel 211 receives input. Furthermore, the display control unit 215f switches the content of an icon related to an operation instruction displayed on the display unit 210 from the first operation instruction that the user can select in the initial state of the imaging device 1 to the second operation instruction that the user can select while the imaging device 1 is being moved. Therefore, the user can input an operation instruction even when the user captures an image while moving or tracking an object. The right region is an approximately half region on the right side of the display area of the display unit 210. Specifically, the right region is a range in which the user can touch the touch panel 211 with the right thumb while placing the right index finger on the release switch 209b.

Figure 14:
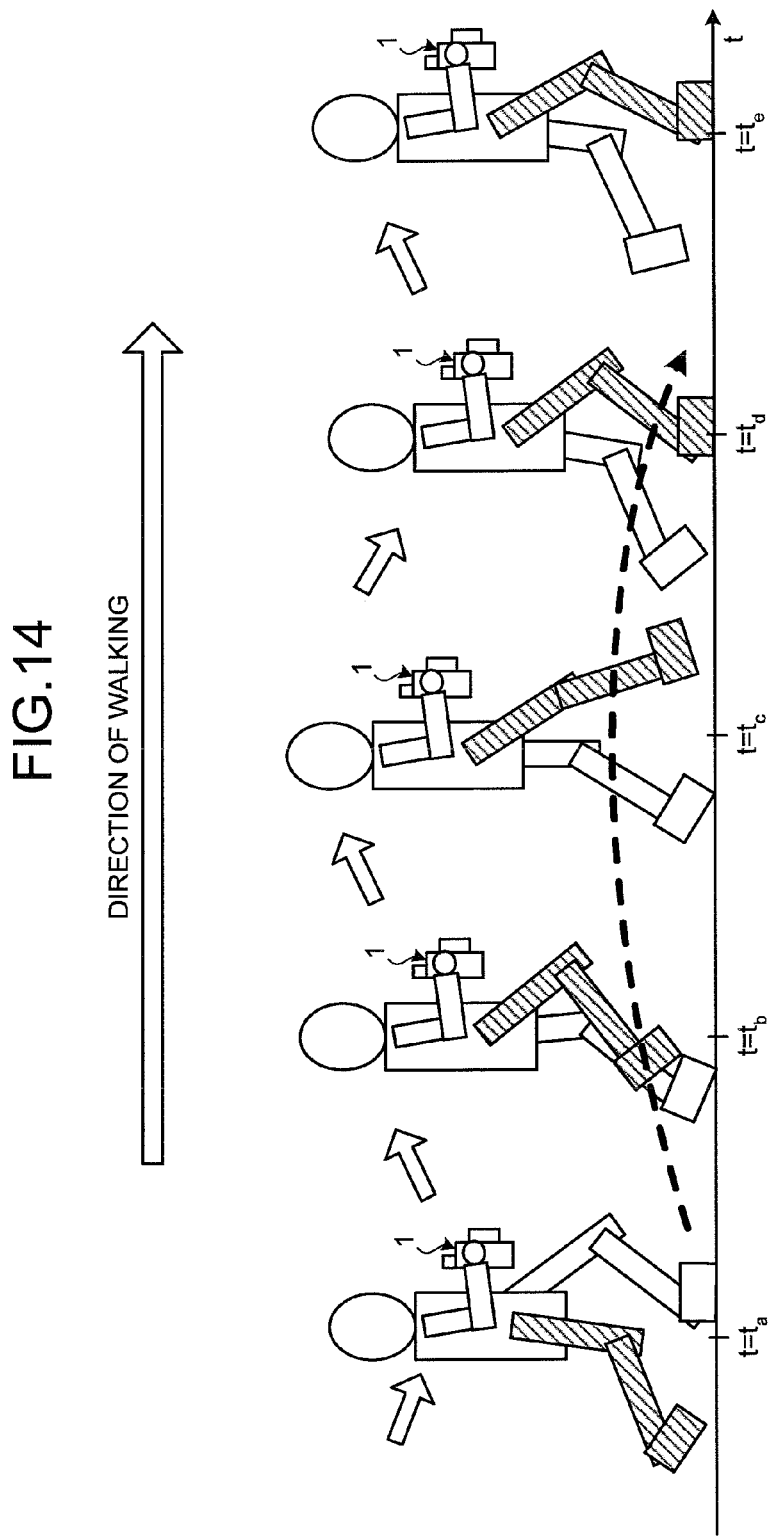
FIG. 14 is a schematic diagram illustrating a situation in which a user moves while using the imaging device according to the first embodiment of the present invention.
Figure 15:
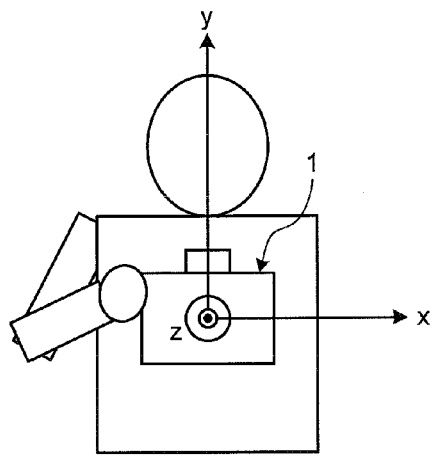
FIG. 15 is a schematic diagram of the front face when viewed from the object side in the situation illustrated in FIG. 14.
Figure 16:
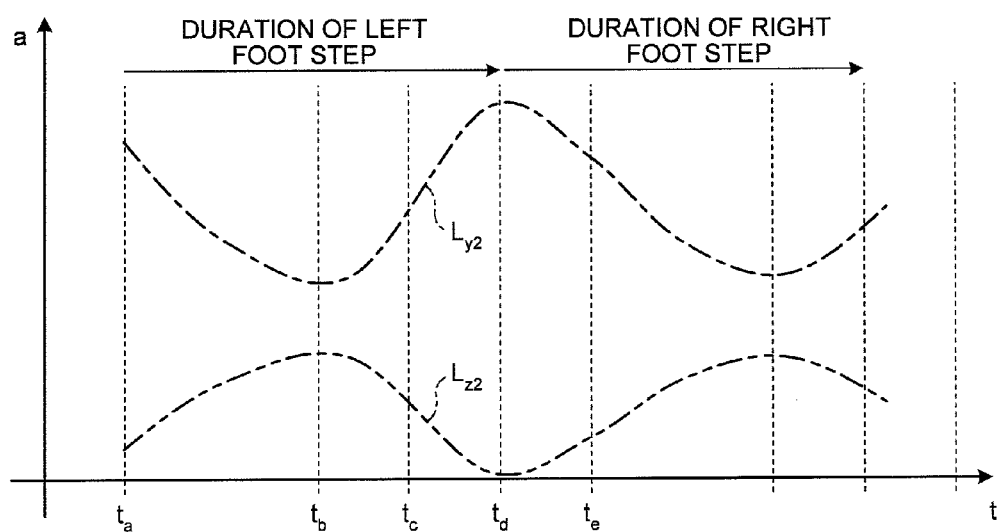
FIG. 16 is a diagram illustrating changes in the magnitude of acceleration detected by the acceleration sensors forming a part of the moving-state determining unit in the situation illustrated in FIG. 14.

An explanation will be given of a determination method performed by the moving-state determining unit 205 to determine whether the imaging device 1 is being moved. FIG. 14 is a schematic diagram illustrating a situation in which a user moves while using the imaging device 1. FIG. 15 is a schematic diagram of the front face when viewed from the object side in the situation illustrated in FIG. 14. FIG. 16 is a diagram illustrating a change in the magnitude of acceleration detected by the acceleration sensors 10 forming a part of the moving-state determining unit 205 in the situation illustrated in FIG. 14. In FIG. 16, the vertical axis represents the magnitude a of the acceleration and the horizontal axis represents time t. A curved line $L_{y2}$ represents the magnitude a of the acceleration detected by the acceleration sensor in the y-axis direction, where the upward direction of the y-axis direction is positive. A curved line $L_{z2}$ represents the magnitude a of the acceleration detected by the acceleration sensor in the z-axis direction, where the traveling direction of the z-axis is positive. Time points $t_a$ to $t_e$ correspond to time points $t_a$ to $t_e$ in FIG. 14, respectively.

As illustrated in FIGS. 14 and 15, the imaging device 1 is largely moved up and down (in the vertical direction) along with the movement of feet while the user is moving (in FIG. 14, a foot stepping forward is indicated by diagonal lines). Along with the vertical movement, the acceleration sensor 10 detects the acceleration in the y-axis direction (see the curved line $L_{y2}$) as a wavelength with a substantially constant cycle of change. Furthermore, the imaging device 1 is largely moved forward when the user takes a step forward. Along with the forward movement, the acceleration sensor 10 detects the acceleration in the z-axis direction (see the curved line $L_{z2}$) as a wavelength with a substantially constant cycle of change.

Therefore, in the first embodiment, when the imaging device 1 captures an image, and if a cycle of change in the acceleration in the vertical direction (the y-axis direction) of the imaging device 1 and the cycle of change in the acceleration in the horizontal direction (the z-axis direction) of the imaging device 1 approximately match each other, the moving-state determining unit 205 determines that the imaging device 1 is being moved (is a tracking state). About one second may be sufficient as the cycle of change in the acceleration in each of the vertical and the horizontal directions to be determined by the moving-state determining unit 205. The moving-state determining unit 205 may determine that the imaging device 1 is being moved (in a tracking state) when a change rate of the acceleration in the vertical direction (the y-axis direction) of the imaging device 1 and a change rate of the acceleration in the horizontal direction (the z-axis direction) of the imaging device 1 approximately match each other. The moving-state determining unit 205 may determine the state of a user, such as walking, sliding down, or sliding, and determine whether an image is captured while the user is tracking an object or traveling side by side with the object, on the basis of the determination result and the user's way to hold the imaging device 1. The moving-state determining unit 205 determines the moving state on the basis of the acceleration detected by the acceleration sensors 10. However, the acceleration sensors 10 are not necessarily needed. It is possible to determine the moving state on the basis of atmospheric pressure according to the vertical movement caused by sliding down or sliding, on the basis of a relation between a moving direction and an orientation direction of the imaging device 1 by using an electronic compass, or on the basis of the periodicity of image distortion. In FIG. 16, because movement in the left-right direction (the x-axis direction) along with the movement of the user is small as illustrated in FIG. 15, the acceleration in the x-axis direction is not illustrated in the figure.

Figure 17:
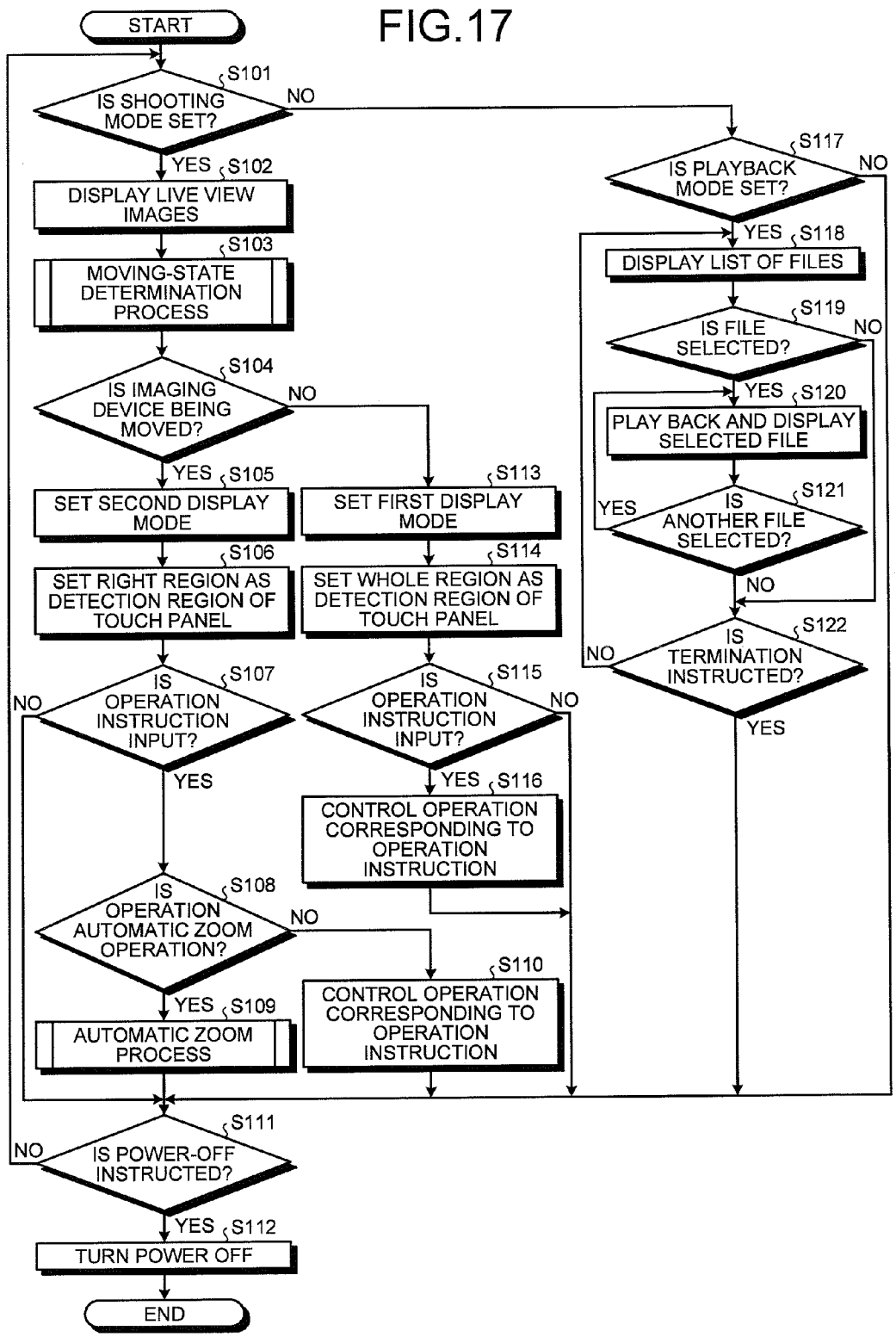
FIG. 17 is a flowchart of an overall process performed by the imaging device according to the first embodiment of the present invention.

An operation performed by the imaging device 1 having the above configuration will be explained below. FIG. 17 is a flowchart of an overall process performed by the imaging device 1.

As illustrated in FIG. 17, the control unit 215 determines whether the imaging device 1 is set to a shooting mode (Step S101). When the imaging device 1 is set to the shooting mode (YES at Step S101), the imaging device 1 goes to Step S102 described below. On the other hand, when the imaging device 1 is not set to the shooting mode (NO at Step S101), the imaging device 1 goes to Step S117 to be described later.

A case will be explained that the imaging device 1 is set to the shooting mode at Step S101 (YES at Step S101). In this case, the display control unit 215*f* displays, on the display unit 210, live view images corresponding to pieces of image data that are sequentially generated at short time intervals by the imaging unit 201 (Step S102).

Subsequently, when the imaging device 1 captures an image, the moving-state determining unit 205 performs a moving-state determination process for determining the moving state of the imaging device 1 (Step S103), and the imaging device 1 goes to Step S104.

Figure 18:
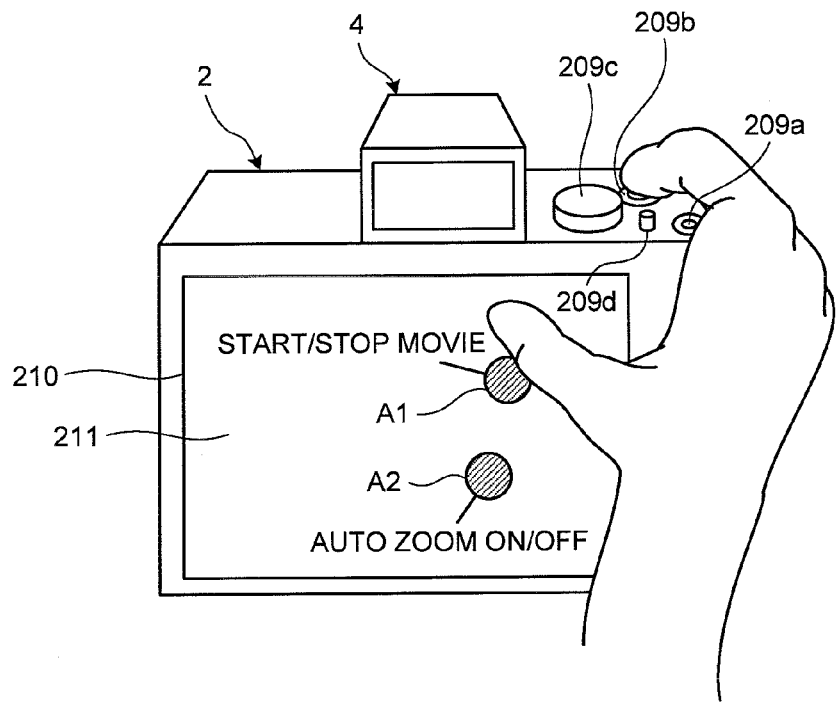
FIG. 18 is a diagram illustrating an example of an image displayed on a display unit in the imaging device according to the first embodiment of the present invention.

A case will be explained that the imaging device 1 is being moved at Step S104 (YES at Step S104). In this case, the display control unit 215*f* sets a second display mode for displaying information related to the second operation instruction on the display unit 210 (Step S105). Specifically, as illustrated in FIG. 18, the display control unit 215*f* superimposes icons A1 and A2 as information related to the second operation instruction onto the live view image displayed on the display unit 210. The icon A1 is used for receiving input of an instruction signal for starting or stopping capturing a moving image, via the touch panel 211. The icon A2 is used for receiving input of an instruction signal for starting or stopping an automatic zoom process for maintaining a constant size of an object contained in an image, via the touch panel 211.

The shooting control unit 215*e* sets a right region as a detection region where the touch panel 211 receives input (Step S106). Therefore, the user is allowed to input an operation instruction based on the icons displayed in the right region. The shooting control unit 215*e* can appropriately set the detection region on the touch panel 211.

When the user touches the touch panel 211 in the region of an icon displayed on the screen of the display unit 210 or when the user inputs an operation instruction to operate the release switch 209*b* (YES at Step S107), and if the operation instruction indicates the automatic zoom process (YES at Step S108), the shooting control unit 215*e* executes the automatic zoom process (Step S109). Thereafter, the imaging device 1 goes to Step S111. On the other hand, when the operation instruction does not indicate the automatic zoom process (NO at Step S108), the shooting control unit 215*e* controls an operation, such as a still image shooting operation or a moving image shooting operation, corresponding to the operation instruction (Step S110), and the imaging device 1 goes to Step S111.

When the operation instruction is not input at Step S107 (NO at Step S107), the imaging device 1 goes to Step S111.

At Step S111, when the power switch 209*a* is pressed (YES at Step S111), the control unit 215 turns the power off (Step S112), and a series of the processes ends.

At Step S111, when the power switch 209*a* is not pressed (NO at Step S111), the imaging device 1 returns to Step S101.

Figure 19:
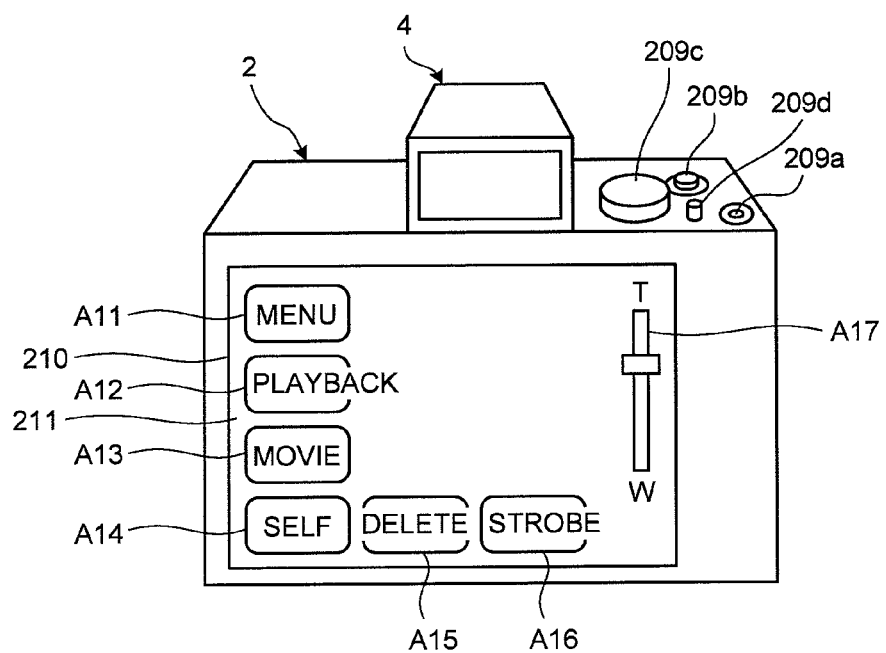
FIG. 19 is a diagram illustrating another example of the image displayed on the display unit in the imaging device according to the first embodiment of the present invention.

A case will be explained that the imaging device 1 is not being moved at Step S104 (NO at Step S104). In this case, the display control unit 215*f* sets a first display mode for displaying information related to the first operation instruction on the display unit 210 (Step S113). Specifically, as illustrated in FIG. 19, the display control unit 215*f* superimposes icons A11 to A17 related to a plurality of operation instructions as the information related to the first operation instruction on to the live view image displayed on the display unit 210.

Subsequently, the shooting control unit 215*e* sets the whole region as the region where the touch panel 211 receives input (Step S114). Therefore, in the situation in which the user can easily input operation instructions, the user can input a desired operation instruction by touching the touch panel 211 in the region of an icon displayed on the display unit 210.

When the user touches the touch panel 211 in the region of an icon displayed on the screen of the display unit 210 or when the user inputs an operation instruction to operate the release switch 209*b* (YES at Step S115), the shooting control unit 215*e* performs an operation corresponding to the operation instruction (Step S116), and the imaging device 1 goes to Step S111. On the other hand, when the user does not touch the touch panel 211 in the region of an icon displayed on the screen of the display unit 210 or when the user does not input the operation instruction to operate the release switch 209*b* (NO at Step S115), the imaging device 1 goes to Step S111.

A case will be explained that the imaging device 1 is not set to the shooting mode at Step S101 (NO at Step S101). In this case, when the imaging device 1 is set to a playback mode (YES at Step S117), the display control unit 215*f* displays a list of files on the display unit 210 (Step S118).

When a file to be enlarged and displayed is selected via the operation input unit 209 or the touch panel 211 (YES at Step S119), the display control unit 215*f* plays back and displays the selected file on the display unit 210 (Step S120).

When another image file is newly selected (YES at Step S121), the imaging device 1 returns to Step S120. On the other hand, when another image file is not selected (NO at Step S121), the imaging device 1 goes to Step S122.

At Step S121, when an instruction to terminate playback of the image is input via the operation input unit 209 or the touch panel 211 (YES at Step S122), the imaging device 1 goes to Step S111. On the other hand, when the instruction to terminate the playback of the image is not input (NO at Step S121), the imaging device 1 returns to Step S118.

At Step S117, when the imaging device 1 is not set to the playback mode (NO at Step S117), the imaging device 1 goes to Step S111.

At Step S119, when a file to be enlarged and displayed is not selected via the operation input unit 209 or the touch panel 211 (NO at Step S119), the imaging device 1 goes to Step S111.

Figure 20:
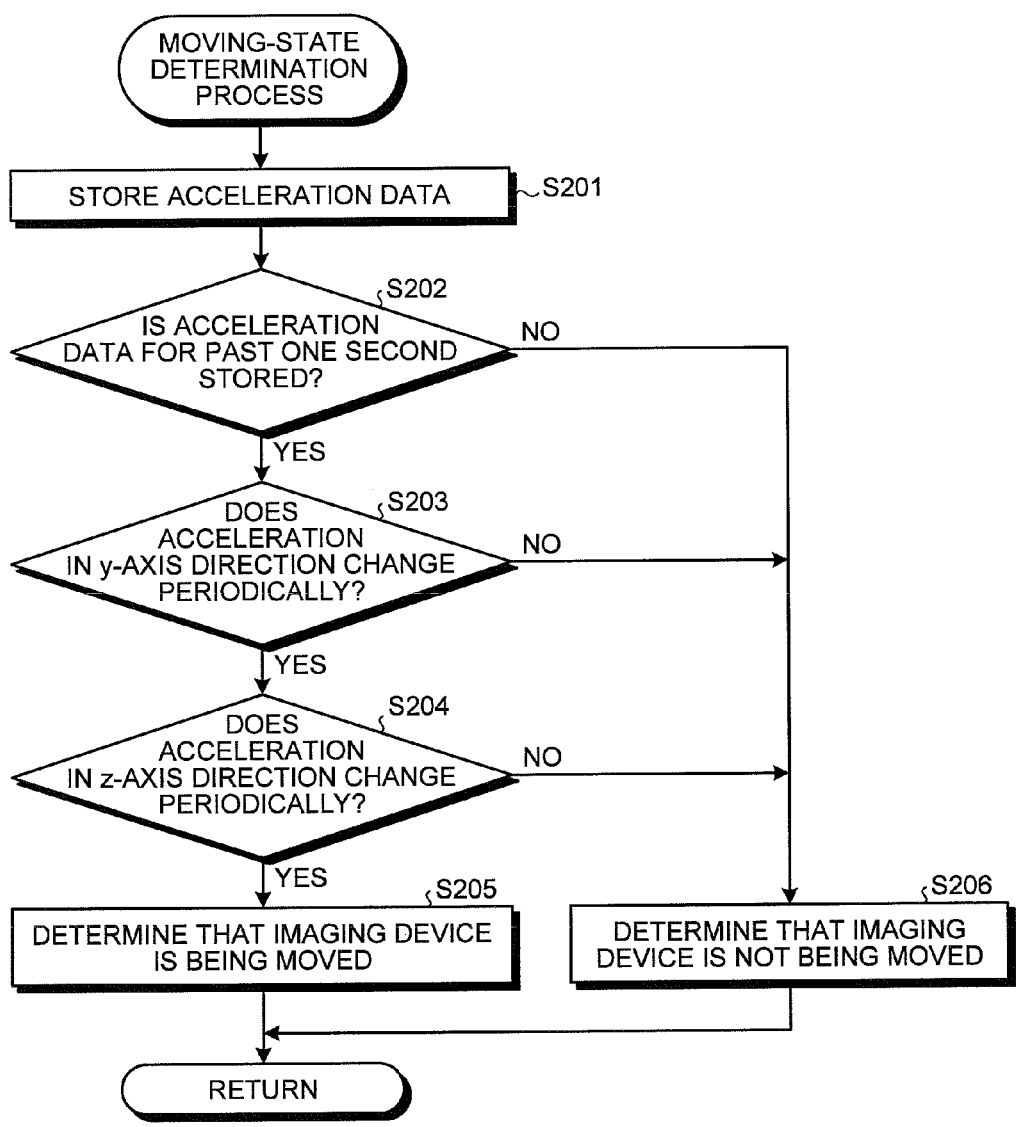
FIG. 20 is a flowchart of an overall moving-state determination process illustrated in FIG. 17.

The moving-state determination process at Step S103 in FIG. 17 will be explained below. FIG. 20 is a flowchart of the overall moving-state determination process illustrated in FIG. 17.

As illustrated in FIG. 20, the moving-state determining unit 205 stores acceleration data of the acceleration detected by the acceleration sensors 10 in the storage unit 212 (Step S201).

When the acceleration data for past one second is stored in the storage unit 212 (YES at Step S202), and if the acceleration in the y-axis direction changes periodically (YES at Step S203) and the acceleration in the z-axis direction changes periodically (YES at Step S204), the moving-state determining unit 205 determines that the imaging device 1 is being moved (Step S205). Thereafter, the imaging device 1 returns to the main routine illustrated in FIG. 17.

On the other hand, when the acceleration data for past one second is not stored in the storage unit 212 (NO at Step S202), when the acceleration in the y-axis direction does not change periodically (NO at Step S203), or when the acceleration in the z-axis direction does not change periodically (NO at Step S204), the moving-state determining unit 205 determines that the imaging device 1 is not being moved (Step S206). Thereafter, the imaging device 1 returns to the main routine illustrated in FIG. 17.

Figure 21:
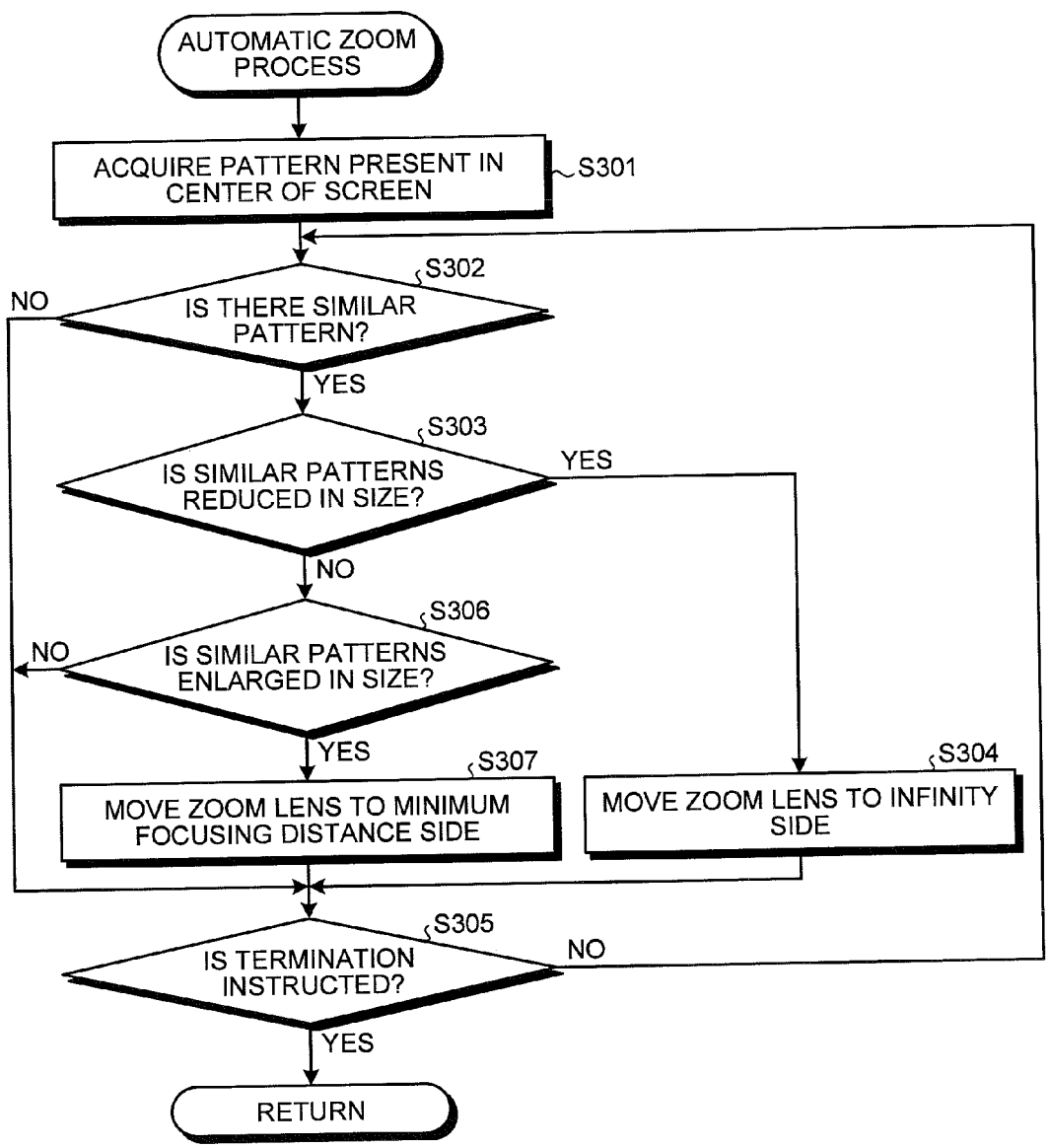
FIG. 21 is a flowchart of an overall automatic zoom process illustrated in FIG. 17.

The automatic zoom process at Step S109 in FIG. 17 will be explained below. FIG. 21 is a flowchart of the overall automatic zoom process illustrated in FIG. 17.

As illustrated in FIG. 21, the region setting unit 215*c* acquires a pattern in the center of an image, as a fixed region in which the size of an object contained in an image displayed on the display unit 210 is maintained constant (Step S301). Specifically, the region setting unit 215*c* acquires a feature portion of the object in the region in the center of the image to be used by pattern matching as described below, and stores the acquired feature portion in the feature storage unit 212*a* of the storage unit 212.

The shooting control unit 215*e* determines whether a similar pattern that is similar to the pattern set by the region setting unit 215*c* is contained in a frame of adjacent image data (Step S302). When the similar pattern is contained (YES at Step S302), the imaging device 1 goes to Step S303 to be described below. On the other hand, when the similar pattern is not contained (NO at Step S302), the imaging device 1 goes to Step S305 to be described below.

At Step S303, the shooting control unit 215*e* determines whether the similar pattern is reduced in size. When the similar pattern is reduced in size (YES at Step S303), the shooting control unit 215*e* drives the lens driving unit 302 via the lens control unit 307 to move the zoom lens 301*a* to the infinity side so that the size of the fixed region set by the region setting unit 215*c* can be obtained (Step S304).

Figure 22:
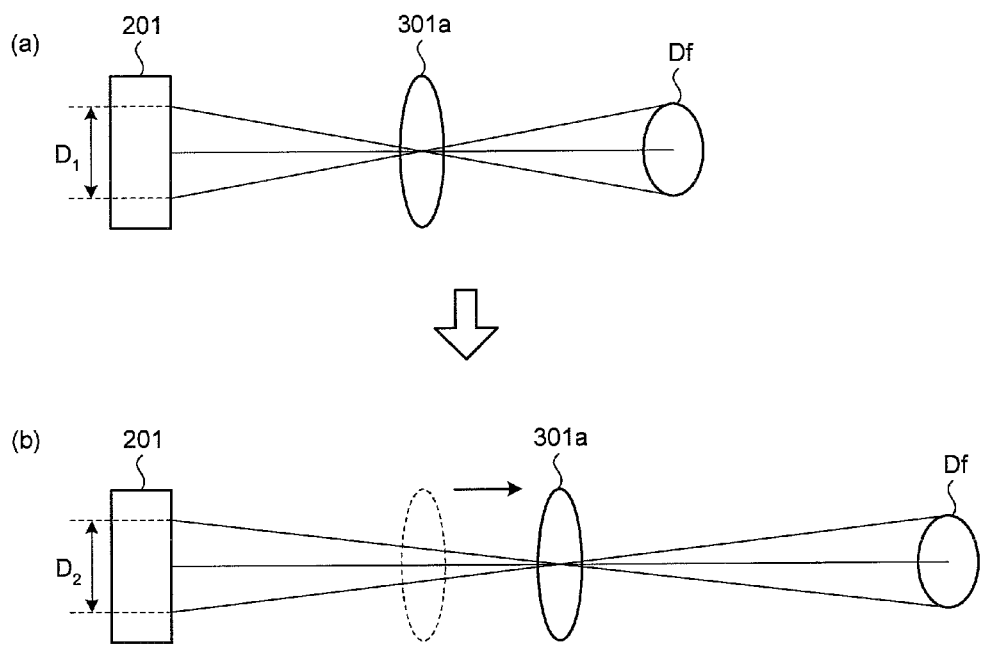
FIG. 22 is a schematic diagram of a relation between an object image formed on an imaging plane of an imaging unit and the amount of movement of a zoom lens in an optical system.

FIG. 22 is a schematic diagram of a relation between an object image formed on an imaging plane of the imaging unit 201 and the amount of movement of the zoom lens in the optical system 301. As illustrated in FIG. 22, the shooting control unit 215*e* moves the zoom lens 301*a* to the infinity side along the optical axis in order to increase the focal length of the optical system 301. Furthermore, the shooting control unit 215*e* moves a focusing lens (not illustrated) along the optical axis along with the movement of the zoom lens 301*a* to adjust a point of focus with respect to an object Df. Consequently, even when a distance between the object Df and the imaging device 1 is increased, an object image of the same size as that before the object Df has gone away from the imaging device 1 is formed on the imaging plane of the imaging unit 201 ($D_1 \rightarrow D_2$). Thus, even when a distance between the imaging device 1 and an object is changed, it is possible to track and capture an image of an object of approximately the same size. The shooting control unit 215*e* may adjust the size of the object to approximately the same size by causing the electronic zoom unit 215*d* to perform electronic zoom.

At Step S305, the shooting control unit 215*e* determines whether an instruction signal for terminating the automatic zoom operation is input through the touch panel 211. When the instruction signal for terminating the automatic zoom operation is input (YES at Step S305), the imaging device 1 returns to the main routine illustrated in FIG. 17). On the other hand, when the instruction signal for terminating the automatic zoom operation is not input (NO at Step S305), the imaging device 1 returns to Step S302.

A case will be explained that the size of the similar pattern is not reduced at Step S303 (NO at Step S303). In this case, the shooting control unit 215*e* determines whether the similar pattern is enlarged in size (Step S306). When the similar pattern is enlarged in size (YES at Step S306), the shooting control unit 215*e* drives the lens driving unit 302 via the lens control unit 307 to move the zoom lens 301*a* to the minimum focusing distance side so that the size of the fixed region set by the region setting unit 215*c* can be obtained (Step S307). Thereafter, the imaging device 1 goes to Step S305.

At Step S306, when the size of the similar pattern is not enlarged (NO at Step S306), the imaging device 1 goes to Step S305.

According to the first embodiment described above, when the moving-state determining unit 205 determines that the imaging device 1 is being moved, the shooting control unit 215*e* changes the content of an operation instruction received by the touch panel 211. Therefore, a user can easily input an operation instruction even in the situation in which the user can hardly input the operation instruction.

Furthermore, according to the first embodiment, the moving-state determining unit 205 determines that the imaging device 1 is being moved when the cycle of change in the acceleration in the vertical direction and the cycle of change in the acceleration in the horizontal direction of the imaging device 1 approximately match each other. Therefore, when the imaging device 1 is being moved, it is possible to reliably switch the content of an operation instruction received by the touch panel 211 to the content of the second operation instruction.

Moreover, according to the first embodiment, when an instruction signal on the automatic zoom operation is input through the touch panel 211, the shooting control unit 215e drives the lens driving unit 302 via the lens control unit 307 to move the zoom lens 301a of the optical system 301 along the optical axis so that the size of the fixed region set by the region setting unit 215c can be obtained. Therefore, even when a distance between the imaging device 1 and an object is changed, it is possible to capture an image of an object of approximately the same size even without user's zoom operation.

Furthermore, according to the first embodiment, the moving-state determining unit 205 determines the moving state when the imaging device 1 is laterally oriented. Therefore, the user can capture an image while a large visual field region is ensured with respect to the display unit 210.

In the first embodiment, the moving-state determining unit 205 determines that the imaging device 1 is being moved when the cycle of change in the acceleration in the vertical direction of the imaging device 1 and the cycle of change in the acceleration in the horizontal direction of the imaging device 1 approximately match each other. However, it is possible to set respective thresholds for the magnitude of the acceleration in the vertical direction and for the magnitude of the acceleration in the horizontal direction, and determine that the imaging device 1 is being moved when the magnitude of the acceleration in the vertical direction and the magnitude of the acceleration in the horizontal direction periodically exceed the respective thresholds. The moving-state determining unit 205 may determine that the imaging device 1 is being moved when a change rate of the acceleration in the vertical and a change rate the horizontal directions are approximately periodically constant.

In the first embodiment, the moving-state determining unit 205 determines the moving state of the imaging device 1 by using the three acceleration sensors 10 whose detection directions are perpendicular to one another. However, it is possible to determine the moving state of the imaging device 1 by using a change rate of an object image contained in adjacent pieces of image data, a change rate of a region containing a face of a person detected by the face detecting unit 215b, a degree of coincidence between adjacent pieces of image data, or a change rate of a shooting distance between an object and the imaging device 1.

Second Embodiment

A second embodiment of the present invention will be explained below. The imaging device 1 according to the second embodiment of the present invention has the same configuration as the imaging device 1 of the first embodiment described above, but a situation in which the moving-state determining unit 205 determines the moving state is different. Therefore, the explanation of the configuration of the imaging device 1 will not be repeated.

Figure 23:
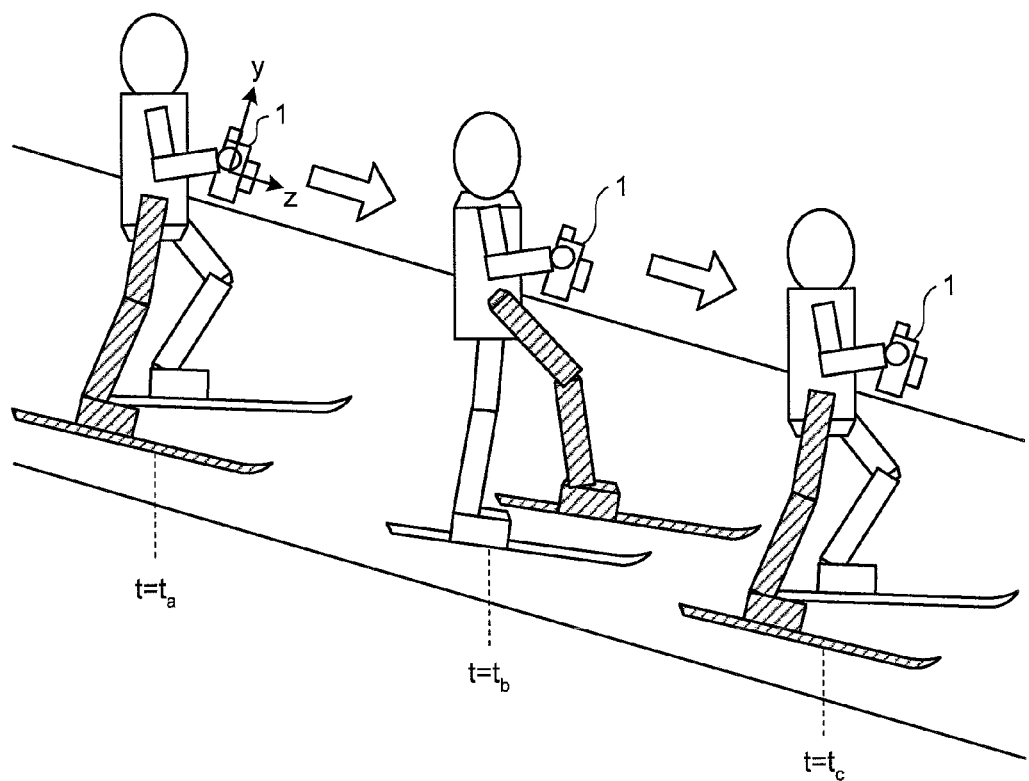
FIG. 23 is a schematic diagram of a situation in which a user tracks an object by using the imaging device in the situation illustrated in FIG. 9.
Figure 25:
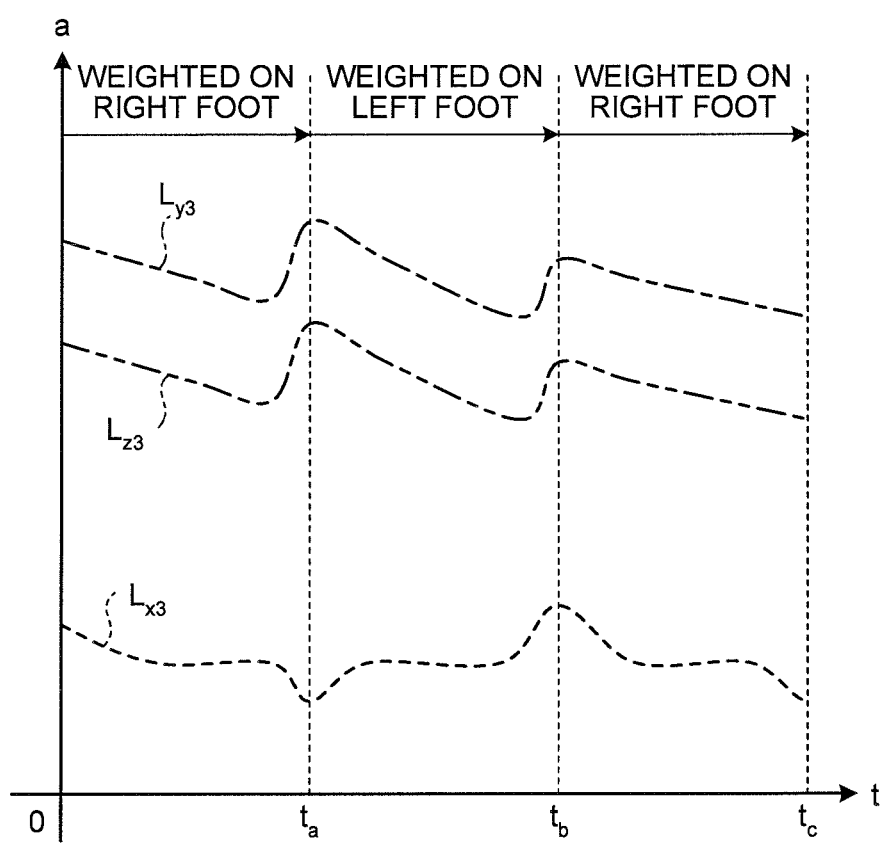
FIG. 25 is a diagram illustrating changes in the magnitude of acceleration detected by the acceleration sensors forming a part of the moving-state determining unit in the situation illustrated in FIG. 23.

FIG. 23 is a schematic diagram of a situation in which a user tracks an object by using the imaging device 1 in the situation illustrated in FIG. 9. FIG. 24 is a schematic diagram illustrating a change in the state of the front face when viewed from the object side in the situation illustrated in FIG. 23. FIG. 25 is a diagram illustrating a change in the magnitude of acceleration detected by the acceleration sensors 10 forming a part of the moving-state determining unit 205 in the situation illustrated in FIG. 23. In FIG. 25, the vertical axis represents the magnitude a of the acceleration and the horizontal axis represents time t. A curved line $L_{y3}$ represents the magnitude of the acceleration detected by the acceleration sensor in the y-axis direction, a curved line $L_{z3}$ represents the magnitude of the acceleration detected by the acceleration sensor in the z-axis direction, and a curved line $L_{x3}$ represents the magnitude of the acceleration detected by the acceleration sensor in the x-axis direction. Time points $t_a$ to $t_c$ correspond to time points $t_a$ to $t_c$ in FIG. 23, respectively.

As illustrated in FIGS. 23 and 24, the imaging device 1 is largely moved in the vertical direction (the y-axis direction) and in the traveling direction (the z-axis direction) as a user shifts the weight in the left-right direction along with skiing (in FIG. 23, a foot on which the weight is shifted is indicated by diagonal lines). Along with the movement in the vertical direction and in the traveling direction, the acceleration sensors 10 detect the acceleration in the y-axis direction (see the curved line $L_{y3}$) and the acceleration in the z-axis direction (see the curved line $L_{z3}$) as wavelengths with a substantially constant cycle of change. Furthermore, the imaging device 1 is slightly moved in the left-right direction (the x-axis direction) with respect to the traveling direction as the user shifts the weight in the left-right direction along with skiing. Along with the movement in the left-right direction, the acceleration sensor 10 detects the acceleration in the x-axis direction (see the curved line $L_{x3}$).

Thus, when the user captures an image of an object while skiing down and tracking the object, the cycle of change in the acceleration in the vertical direction (the y-axis direction) of the imaging device 1 and the cycle of change in the acceleration in the traveling direction (the z-axis direction) of the imaging device 1 approximately match each other. Therefore, in the second embodiment, when the imaging device 1 captures an image, and if the cycle of change in the acceleration in the vertical direction (the y-axis direction) of the imaging device 1 and the cycle of change in the acceleration in the horizontal direction (the z-axis direction) of the imaging device 1 approximately match each other, the moving-state determining unit 205 determines that the imaging device 1 is being moved (in a tracking state).

According to the second embodiment described above, similarly to the first embodiment described earlier, a user can easily perform a desired operation even in the situation in which the user can hardly input an operation instruction.

Figure 26:
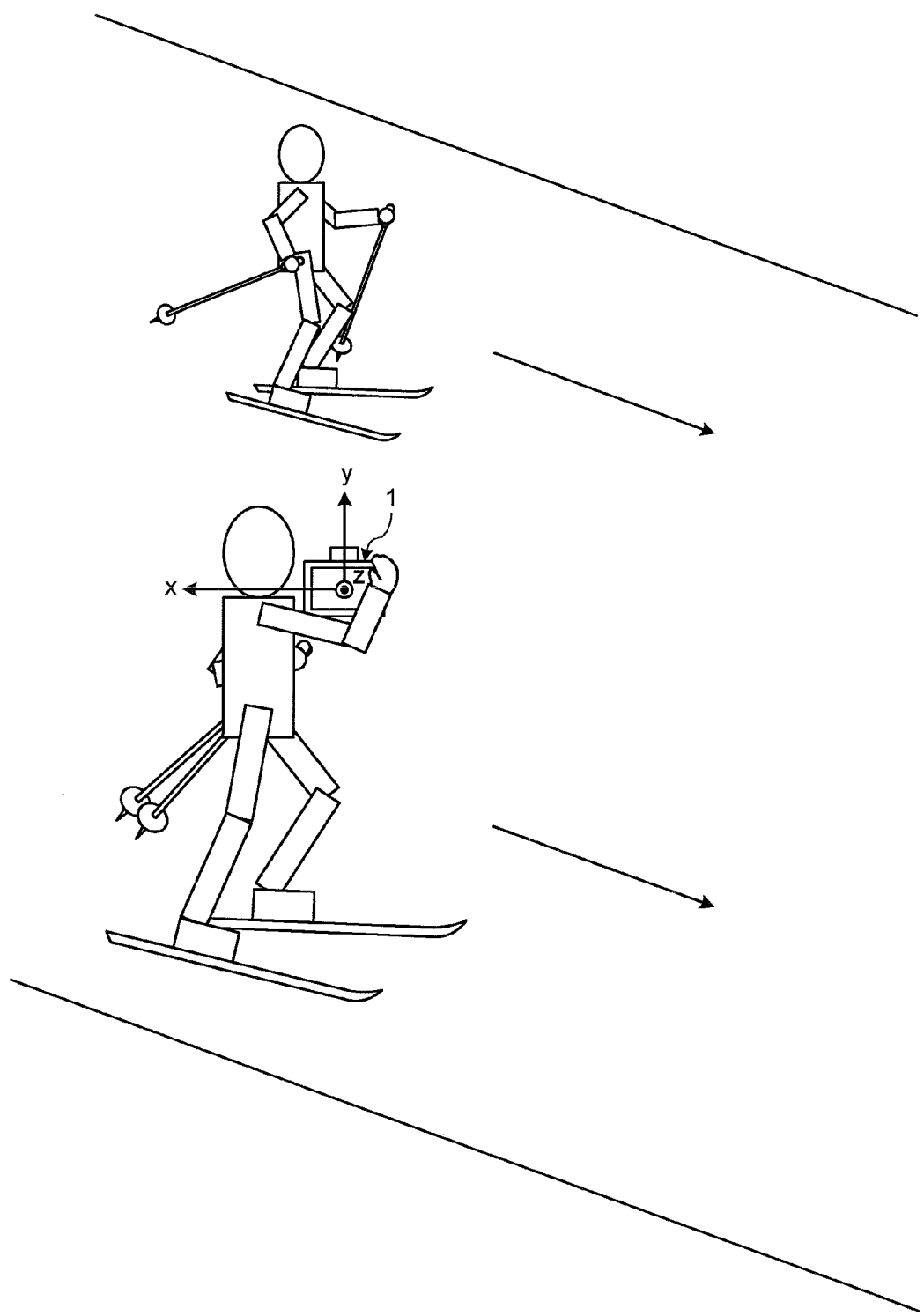
FIG. 26 is a schematic diagram illustrating a situation in which a user captures an image by using an imaging device according to a modification of a second embodiment of the present invention while tracking and traveling side by side with an object.

In the second embodiment, the situation is explained in which the object is tracked from behind. However, the embodiment may be applied to a situation in which the user captures an image while tracking and traveling side by side with the object. FIG. 26 is a schematic diagram illustrating a situation in which a user captures an image by using the imaging device 1 while tracking and traveling side by side with an object. In this situation, the imaging device 1 is largely moved in the vertical direction (the y-axis direction) and in the traveling direction (the x-axis direction). Along with the movement in the vertical direction and in the traveling direction, the acceleration sensors 10 detect the acceleration in the y-axis direction and the acceleration in the x-axis direction as wavelengths with a substantially constant cycle of change. As described above, even when the user captures an image while tracking and traveling side by side with the object, the moving-state determining unit 205 can determine whether the imaging device 1 is being moved.

Third Embodiment

A third embodiment of the present invention will be explained. The imaging device 1 according to the third embodiment has the same configuration as the imaging device 1 of the first embodiment described above, but a process performed by the imaging device 1 is different. Therefore, in the third embodiment, the process performed by the imaging device 1 will be explained. The same components are denoted by the same reference numerals.

Figure 27:
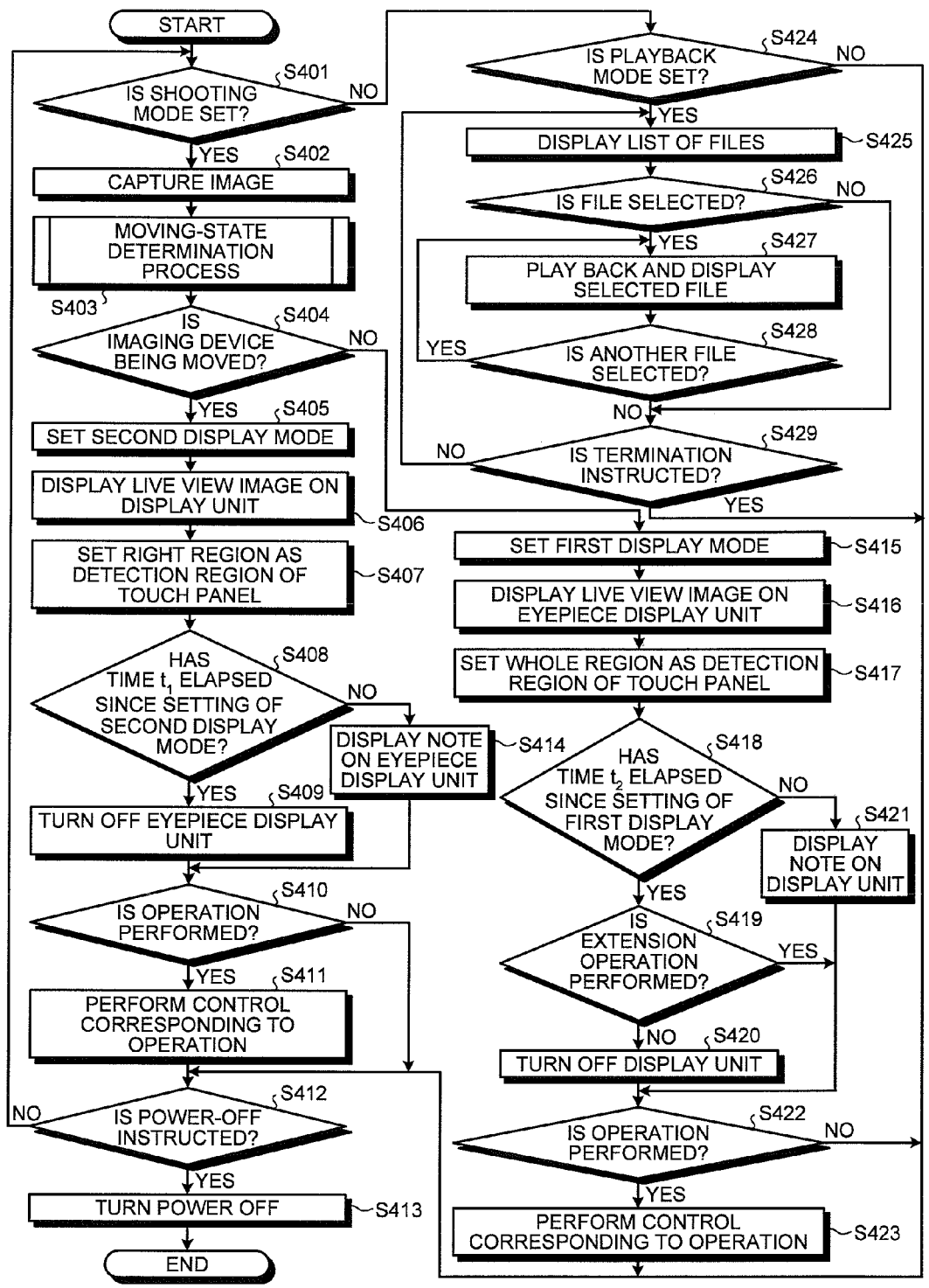
FIG. 27 is a flowchart of an overall process performed by an imaging device according to a third embodiment of the present invention.

FIG. 27 is a flowchart of an overall process performed by the imaging device 1 according to the third embodiment of the present invention.

As illustrated in FIG. 27, the control unit 215 determines whether the imaging device 1 is set to a shooting mode (Step S401). When the imaging device 1 is set to the shooting mode (YES at Step S401), the imaging device 1 goes to Step S402 described below. On the other hand, when the imaging device 1 is not set to the shooting mode (NO at Step S401), the imaging device 1 goes to Step S424 to be described later.

A case will be explained that the imaging device 1 is set to the shooting mode at Step S401 (YES at Step S401). In this case, the imaging device 1 starts capturing an image under the control of the shooting control unit 215*e* (Step S402).

Subsequently, the moving-state determining unit 205 performs the moving-state determination process for determining the moving state of the imaging device 1 (Step S403), and the imaging device 1 goes to Step S404.

Figure 28:
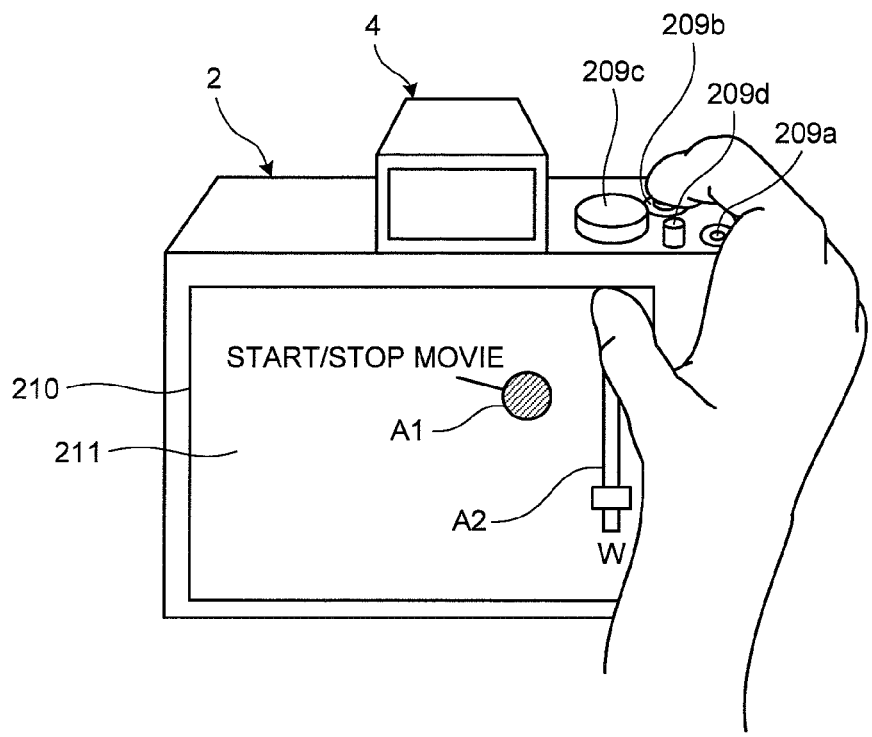
FIG. 28 is a diagram illustrating an example of an image displayed on a display unit in the imaging device according to the third embodiment of the present invention.

A case will be explained that the imaging device 1 is being moved at Step S404 (YES at Step S404). In this case, the display control unit 215*f* sets the second display mode as a display mode for displaying information related to the second operation instruction on the display unit 210 (Step S405), and displays a live view image corresponding to image data generated by the imaging unit 201 on the display unit 210 (Step S406). Specifically, as illustrated in FIG. 28, the display control unit 215*f* superimposes the icons A1 and A2 as the information related to the second operation instruction onto the live view image displayed on the display unit 210. The icon A1 is used for receiving input of an instruction signal for starting or stopping capturing a moving image, via the touch panel 211. The icon A2 is used for receiving input of an instruction signal for changing an angle of view (zoom factor) of the optical system 301, via the touch panel 211. The display control unit 215*f* may display the icons A1 and A2 on the eyepiece display unit 4.

The shooting control unit 215*e* sets a right region as a detection region where the touch panel 211 receives input (Step S407). Therefore, the user is allowed to input an operation instruction based on the icons displayed in the right region. The shooting control unit 215*e* can appropriately set the detection region on in the touch panel 211.

The control unit 215 determines whether a predetermined time $t_1$ (e.g., 30 seconds) has elapsed since the setting of the second display mode in the imaging device 1 (Step S408). When the predetermined time $t_1$ has elapsed since the setting of the second display mode in the imaging device 1 (YES at Step S408), the control unit 215 turns off the eyepiece display unit 4 (Step S409), and the imaging device 1 goes to Step S410.

At Step S410, when the user performs an operation of touching the touch panel 211 in the region of an icon displayed on the display unit 210 or pressing the release switch 209*b* (YES at Step S410), the shooting control unit 215*e* controls execution of, for example, a still image shooting operation or a zoom operation process corresponding to the operation (Step S411), and the imaging device 1 goes to Step S412.

At Step S410, when the operation is not performed (NO at Step S410), the imaging device 1 goes to Step S412.

At Step S412, when the power switch 209*a* is pressed (YES at Step S412), the control unit 215 turns the power off (Step S413) and a series of the processes ends.

At Step S412, when the power switch 209*a* is not pressed (NO at Step S412), the imaging device 1 returns to Step S401.

Figure 29:
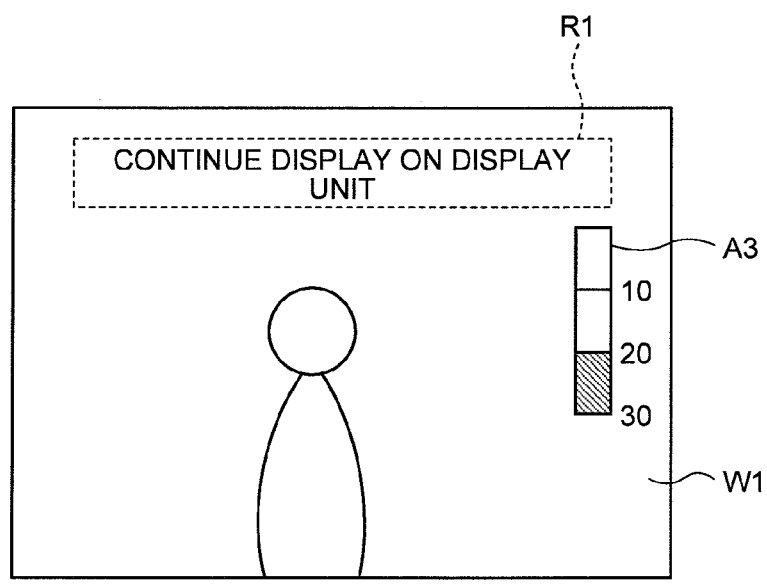
FIG. 29 is a diagram illustrating another example of the image displayed on the display unit in the imaging device according to the third embodiment of the present invention.

A case will be explained that the predetermined time $t_1$ has not elapsed since the setting of the second display mode at Step S408 (NO at Step S408). In this case, the display control unit 215*f* displays, on the eyepiece display unit 4, a note indicating that a live view image is displayed on the display unit 210 (Step S414). Specifically, as illustrated in FIG. 29, the display control unit 215*f* superimposes a note indicating that display of the live view image is to be switched, onto a region R1 of a live vie image W1 displayed on the eyepiece display unit 4. The display control unit 215*f* also displays a time bar A3 associated with a time taken before the display of the live view image is switched from the eyepiece display unit 4 to the display unit 210. Therefore, the user can intuitively recognize a display destination to which the live view image is displayed and the time taken before the display destination is switched.

Figure 30:
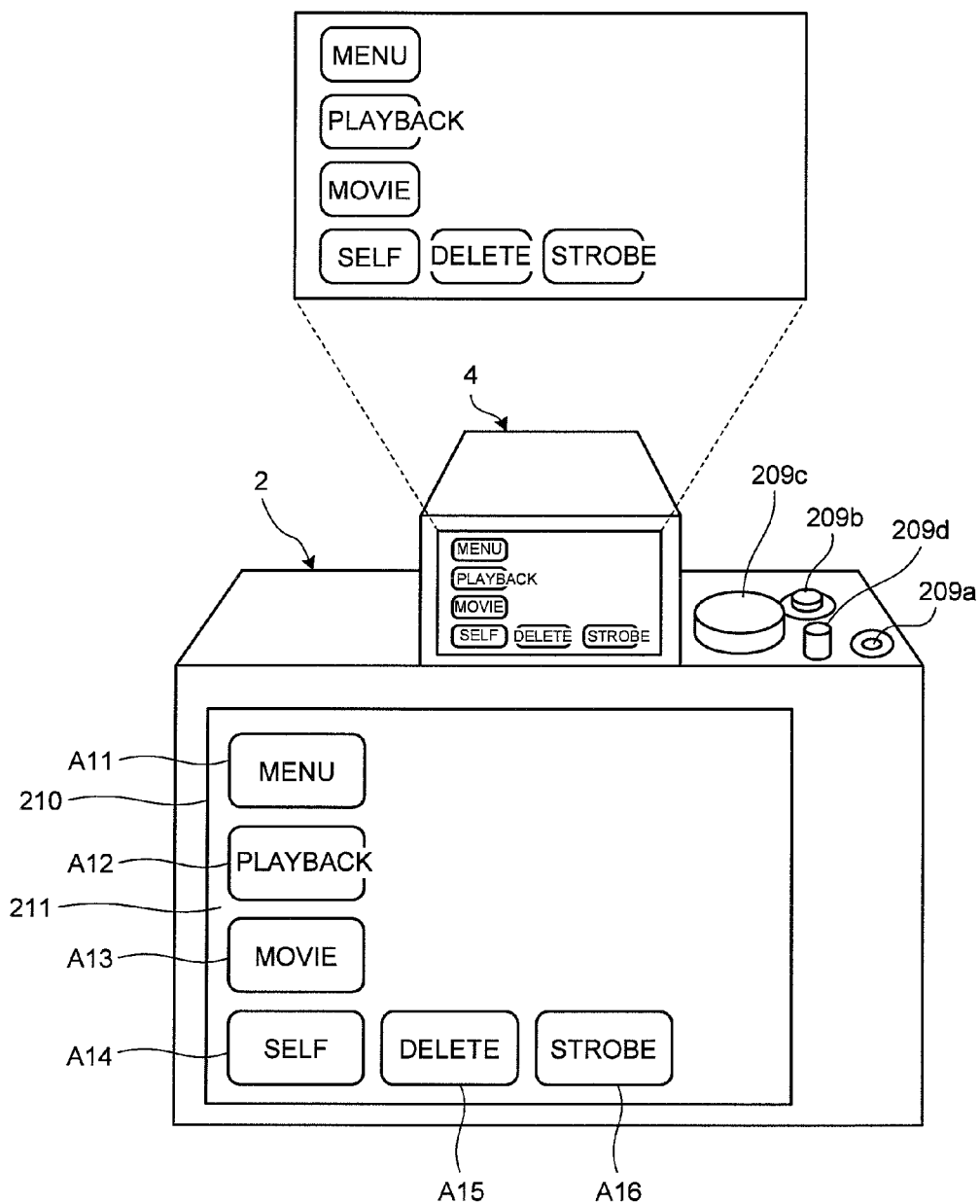
FIG. 30 is a diagram illustrating still another example of the image displayed on the display unit in the imaging device according to the third embodiment of the present invention.

A case will be explained that the imaging device 1 is not being moved at Step S404 (NO at Step S404). In this case, the display control unit 215*f* sets the first display mode as a display mode for displaying information related to the first operation instruction on the display unit 210 (Step S415), and displays a live view image corresponding to image data generated by the imaging unit 201 on the eyepiece display unit 4 (Step S416). Specifically, as illustrated in FIG. 30, the display control unit 215*f* displays icons A11 to A16 related to a plurality of operation instructions as the information related to the first operation instruction on the display unit 210, and also displays the live view image on the eyepiece display unit 4.

Subsequently, the control unit 215 sets the whole region as the region where the touch panel 211 receives input to (Step S417). Therefore, when the user stands still, the user can input a desired operation instruction by touching the touch panel 211 in the region of an icon displayed on the display unit 210. Furthermore, the user can input a desired operation instruction by speculating the positions of the icons A11 to A16 displayed on the display unit 210 while viewing the icons A11 to A16 displayed on the eyepiece display unit 4.

The control unit 215 determines whether a predetermined time $t_2$ ($t_1 < t_2$, e.g., two minutes) has elapsed since the setting of the first display mode in the imaging device 1 (Step S418). When the predetermined time $t_2$ has elapsed since the setting of the first display mode (YES at Step S418), and if an extension operation for extending a display duration of an image on the display unit 210 is performed by pressing the display switching switch 209*d* (YES at Step S419), the imaging device 1 goes to Step S422 to be described later. On the other hand, when the extension operation is not performed (NO at Step S419), the control unit 215 turns off the display on the display unit 210 (Step S420), and the imaging device 1 goes to Step S422 to be described later.

At Step S418, when the predetermined time $t_2$ has not elapsed since the setting of the first display mode (NO at Step S418), the display control unit 215*f* displays, on the display unit 210, a note indicating that the live view image is to be displayed on the eyepiece display unit 4 (Step S421), and the imaging device 1 goes to Step S422.

At Step S422, when the user performs an operation of touching the touch panel 211 in the region of an icon displayed on the screen of the display unit 210 or pressing the release switch 209*b* (YES at Step S422), the shooting control unit 215e controls execution of a process or the like corresponding to the operation (Step S423), and the imaging device 1 goes to Step S412.

At Step S422, when the user does not perform any operation (NO at Step S422), the imaging device 1 goes to Step S412.

A case will be explained that the imaging device 1 is not set to the shooting mode at Step S401 (NO at Step S401). In this case, when the imaging device 1 is set to the playback mode (YES at Step S424), the display control unit 215f displays a list of files on the display unit 210 (Step S425).

When a file to be enlarged and displayed is selected via the operation input unit 209 or the touch panel 211 (YES at Step S426), the display control unit 215f plays back and displays the selected file on the display unit 210 (Step S427).

When another image file is newly selected (YES at Step S428), the imaging device 1 returns to Step S427. On the other hand, when another image file is not selected (NO at Step S428), the imaging device 1 goes to Step S429.

At Step S429, when an instruction to terminate playback of the image is input via the operation input unit 209 or the display unit 210 (YES at Step S429), the imaging device 1 goes to Step S412. On the other hand, when the instruction to terminate the playback of the image is not input (NO at Step S429), the imaging device 1 returns to Step S425.

At Step S424, when the imaging device 1 is not set to the playback mode (NO at Step S424), the imaging device 1 goes to Step S412.

Figure 31:
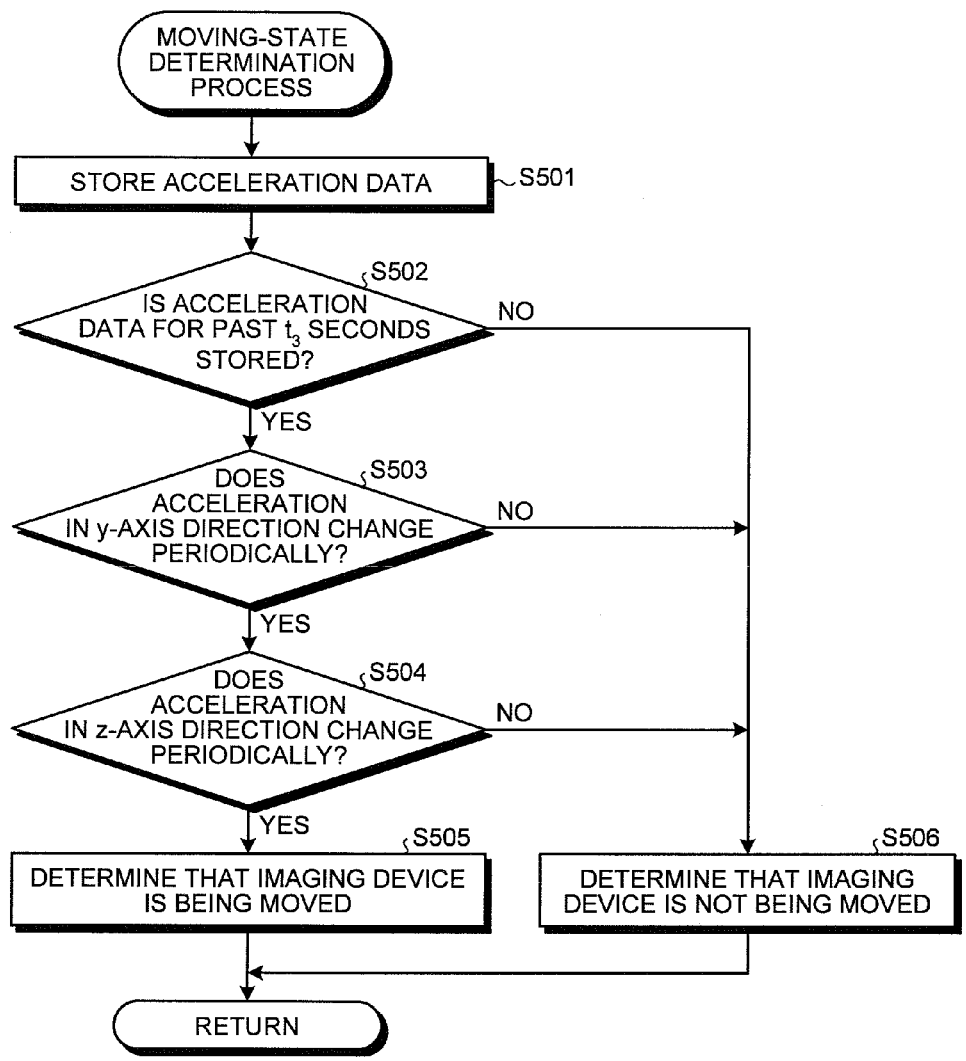
FIG. 31 is a flow chart of an overall moving-state determination process illustrated in FIG. 27.

The moving-state determination process at Step S403 in FIG. 27 will be explained below. FIG. 31 is a flowchart of the overall moving-state determination process illustrated in FIG. 27.

As illustrated in FIG. 31, the moving-state determining unit 205 stores acceleration data of the acceleration detected by the acceleration sensors 10 in the storage unit 212 (Step S501).

When the acceleration data for past $t_3$ seconds (e.g., one second) is stored in the storage unit 212 (YES at Step S502), and if the acceleration in the y-axis direction changes periodically (YES at Step S503) and the acceleration in the z-axis direction changes periodically (YES at Step S504), the moving-state determining unit 205 determines that the imaging device 1 is being moved (Step S505). Thereafter, the imaging device 1 returns to the main routine illustrated in FIG. 27.

On the other hand, when the acceleration data for past $t_3$ seconds is not stored in the storage unit 212 (NO at Step S502), when the acceleration in the y-axis direction does not change periodically (NO at Step S503), or when the acceleration in the z-axis direction does not change periodically (NO at Step S504), the moving-state determining unit 205 determines that the imaging device 1 is not being moved (Step S506). Thereafter, the imaging device 1 returns to the main routine illustrated in FIG. 27.

According to the third embodiment described above, when the moving-state determining unit 205 determines that the imaging device 1 is being moved, the display control unit 215f switches the display destination of a live view image corresponding to image data generated by the imaging unit 201 from the eyepiece display unit 4 to the display unit 210. Therefore, even when a user captures an image while moving, a sufficient visual field can be obtained and the user can safely capture an image.

Furthermore, according to the third embodiment, when the display control unit 215f switches the display destination of the live view image from one to the other between the display unit 210 and the eyepiece display unit 4, the live view image is displayed on both of the display unit 210 and the eyepiece display unit 4 for a predetermined time. Therefore, it is possible to prevent the display destination of the live view image from being instantly switched.

Moreover, according to the third embodiment, when the display control unit 215f switches the display destination of the live view image from the display unit 210 to the eyepiece display unit 4, a display duration of the live view image on the display unit 210 is longer than a display duration of the live view image on the eyepiece display unit 4. Therefore, when a user stops for a while, e.g., for 30 seconds, in order to wait for a signal when the user captures an image while walking, the display unit 210 continuously displays the live view image. Therefore, when the user moves again after stopping for a while, the user can continue shooting while viewing the live view image displayed on the display unit 210.

Furthermore, according to the third embodiment, when the display control unit 215f switches the display destination of the live view image from the display unit 210 to the eyepiece display unit 4, and if an instruction signal is input from the display switching switch 209d, the display duration of the live view image on the display unit 210 is extended. Therefore, even while the user does not move, the user can continue shooting while viewing the live view image displayed on the display unit 210 by operating the display switching switch 209d.

Moreover, according to the third embodiment, the moving-state determining unit 205 determines that the imaging device 1 is being moved when the cycle of change in the acceleration in the vertical direction of the imaging device 1 and the cycle of change in the acceleration in the horizontal direction of the imaging device 1 approximately match each other. Therefore, when the imaging device 1 is being moved, it is possible to reliably switch the content of an operation instruction received by the touch panel 211 to the content of the second operation instruction.

Furthermore, according to the third embodiment, the moving-state determining unit 205 determines the moving state of the imaging device 1 when the lateral direction of an image displayed on the display unit 210 is approximately the same as the horizontal direction of the imaging device 1. Therefore, the user can capture an image while moving, with a large visual filed region ensured with respect to the display unit 210.

In the third embodiment, the moving-state determining unit 205 determines that the imaging device 1 is being moved when the cycle of change in the acceleration in the vertical direction of the imaging device 1 and the cycle of change in the acceleration in the horizontal direction of the imaging device 1 approximately match each other. However, it is possible to set respective thresholds for the magnitude of the acceleration in the vertical direction and for the magnitude of the acceleration in the horizontal direction, and determine that the imaging device 1 is being moved when the magnitude of the acceleration in the vertical direction and the magnitude of the acceleration in the horizontal direction periodically exceed the respective thresholds. The moving-state determining unit 205 may determine that the imaging device 1 is being moved when a change rate of the acceleration in the vertical and a change rate of the acceleration in the horizontal directions approximately periodically match each other.

In the third embodiment, the moving-state determining unit 205 determines the moving state of the imaging device 1 by using the three acceleration sensors 10 whose detection directions are perpendicular to one another. However, it is possible to determine the moving state of the imaging device 1 by using a change rate of an object image contained in adjacent pieces of image data, a change rate of a region containing a face of a person detected by the face detecting unit 215b, a degree of coincidence between adjacent pieces of image data, or a change rate of a shooting distance between the object and the imaging device 1.

In the third embodiment, the moving-state determining unit 205 determines the moving state of the imaging device 1 by using the three acceleration sensors 10 whose detection directions are perpendicular to one another. However, the acceleration sensors 10 are not necessarily needed. It is possible to determine the moving state on the basis of atmospheric pressure according to a vertical change along with sliding down or sliding by using an atmospheric pressure sensor, on the basis of a relation between a moving direction and an orientation direction of the imaging device 1 by using an electronic compass, or on the basis of the periodicity of image distortion.

In the third embodiment, the shooting control unit 215e changes the content of an operation instruction received by the touch panel 211 depending on the determination result of the moving-state determining unit 205; however, this is not limited to the touch panel 211. For example, it is possible to change an association relation between the content received by a mechanical switch, such as the shooting mode switching switch 209c or the display switching switch 209d, and an operation performed by the imaging device 1.

Other Embodiments

Figure 32:
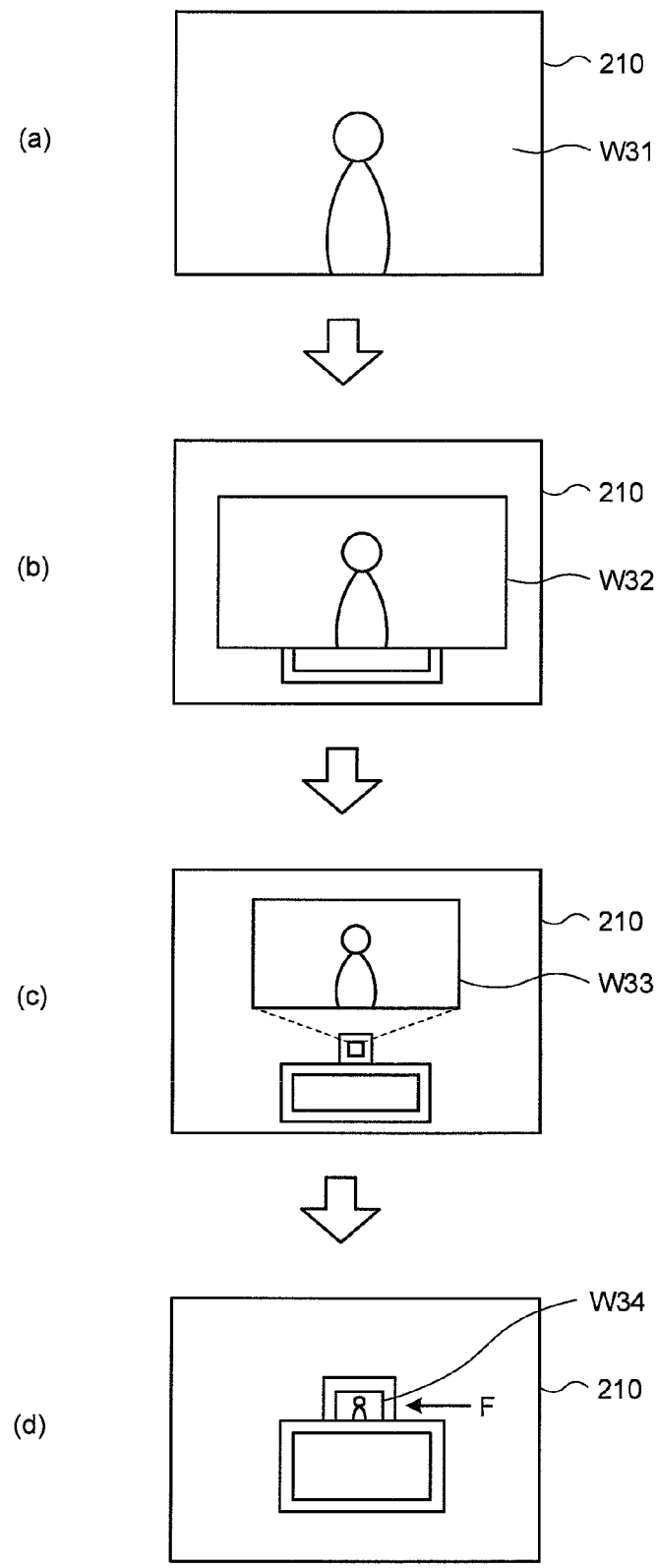
FIG. 32 is a diagram illustrating examples of images displayed on a display unit in an imaging device according to another embodiment of the present invention.

In the embodiments described above, when the display control unit 215f switches the display destination of the live view image, a note as the switching information is superimposed on the live view image displayed on the display unit 210. However, as illustrated in FIG. 32, it is possible to change the switching information step-by-step in a temporal sequence (FIG. 32(a) to FIG. 32(d)) on the display unit 210. Specifically, the display control unit 215f displays images W31 to W34 step-by-step in a temporal sequence on the display unit 210 to indicate that the live view image is to be displayed on the eyepiece display unit 4, and emphasizes, by displaying an arrow F, that the live view image is to be displayed on the eyepiece display unit 4. Therefore, the user can intuitively recognize that the display destination of the live view image is to be switched from the display unit 210 to the eyepiece display unit 4 because of the movement.

Figure 33:
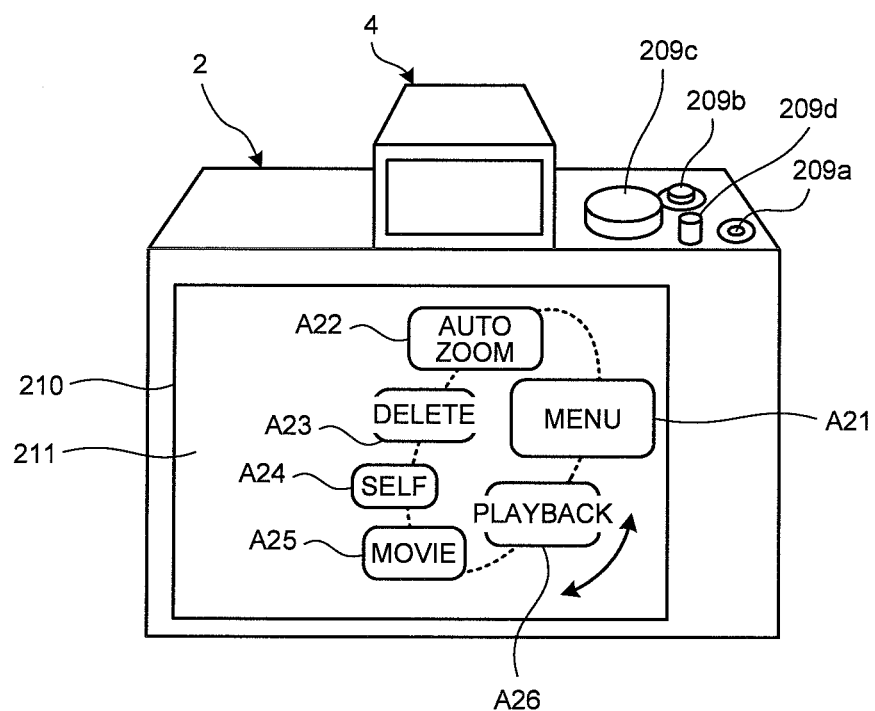
FIG. 33 is a diagram illustrating an example of an image displayed on a display unit in an imaging device according to still another embodiment of the present invention.

In the above embodiments, the display control unit 215f displays, on the display unit 210, icons of the zoom operation and the moving image shooting operation as the information related to the second operation instruction. However, as illustrated in FIG. 33, it is possible to display icons A21 to A26 as the information related to various shooting operations as the information related to the second operation instruction on the right region of the display unit 210. Furthermore, the display control unit 215f may change the positions of the icons A21 to A26 displayed on the display unit 210 in a rotary manner along with a slide operation that a user performs on the touch panel 211. Therefore, the user can input a desired operation instruction by performing the slide operation on the touch panel 211 even in a difficult situation.

In the embodiments described above, the display control unit 215f displays the information related to the zoom operation and the moving image shooting operation as the information related to the second operation instruction. However, it is possible to appropriately change the content of the second operation instruction. For example, it is possible to change the content of the second operation instruction by operating the MENU icon A11 (see FIG. 19) that the display control unit 215f has displayed as the information related to the first operation instruction on the display unit 210 in the initial state of the imaging device 1.

Moreover, in the embodiments described above, the display control unit 215f switches the display destination of the live view image between the display unit 210 and the eyepiece display unit 4 depending on the determination result of the moving-state determining unit 205. However, it is not necessary to switch between the display unit 210 and the eyepiece display unit 4. For example, the display control unit 215f may divide the display area of the display unit 210 into a first display area and a second display area that is smaller than the first display area, and display the live view image and the operation information on the first display area and the second display area. Furthermore, the display control unit 215f may superimpose and display the live view image or the operation information with a smaller size than the display area onto the display area of the display unit 210.

In the embodiments described above, the moving-state determining unit 205 determines the moving state of the imaging device 1 on the basis of the movement that is periodically detected by the acceleration sensor. However, it is possible to detect the degree of image distortion from image data output by the imaging element and determine the moving state of the imaging device 1 on the basis of the detection result. Furthermore, the moving-state determining unit 205 may determine the moving state of the imaging device 1 on the basis of detection results in the vertical and the horizontal directions that are periodically detected by a gyro sensor. Moreover, the moving-state determining unit 205 may determine the moving state of the imaging device 1 on the basis of a change in luminance, luminance distribution, tone, or feature data contained in the image data. Furthermore, the moving-state determining unit 205 may determine the moving state of the imaging device 1 on the basis of a difference between frames of pieces of image data that are sequentially generated by the imaging element. It is also possible to integrate or disintegrate the above-mentioned various methods to detect the movement in the vertical and the horizontal directions.

In the first and the second embodiments, the lens unit 3 is detachably attached to the main body unit 2. However, the lens unit 3 and the main body unit 2 may be integrated with each other.

In the first and the second embodiments, the eyepiece display unit 4 is an electronic viewfinder. However, the eyepiece display unit 4 may be an optical viewfinder.

In the first and the second embodiments, the eyepiece display unit 4 is detachably attached to the main body unit 2. However, the eyepiece display unit 4 and the main body unit 2 may be integrated with each other.

In the first and the second embodiments, the portable device is explained as a digital single-lens reflex camera. However, the portable device may be applied to various electronic devices equipped with an imaging function and a display function, such as digital video cameras, portable phones with cameras, or personal computers with cameras.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable device comprising:
   an imaging unit that captures an image of an object and generates image data of the object;
   a display unit that displays an image of the image data;
   an input unit that receives input of an operation instruction on an operation performed by the portable device;
   a moving-state determining unit that determines a moving state of the portable device when the portable device is in an image capturing mode; and
   a control unit that changes a content of an operation instruction, depending on a determination result of the moving-state determining unit.

2. The portable device according to claim 1, wherein
   the moving-state determining unit determines whether the portable device is being moved on the basis of a cycle of movement of the portable device in a vertical direction.

3. The portable device according to claim 2, wherein
   the moving-state determining unit includes an acceleration sensor, and determines that the portable device is being moved when a cycle of change in acceleration in a vertical direction of the portable device and a cycle of change in acceleration in a horizontal direction of the portable device approximately match each other.

4. The portable device according to claim 3, further comprising:
   a display control unit that controls a display mode of the image displayed on the display unit, and that superimposes information, the information being related to an operation instruction that is selectable while the portable device is being moved, onto the image displayed on the display unit depending on the determination result of the moving-state determining unit.

5. The portable device according to claim 4, wherein
   the input unit includes a touch panel that is arranged on a display screen of the display unit and that receives input of the operation instruction corresponding to a position of a thing that is in contact with the touch panel from outside, and
   the control unit sets a region where the information related to the operation instruction is displayed on the display unit, as a region where the touch panel receives input.

6. The portable device according to claim 5, further comprising:
   an optical system that includes at least a zoom lens and that condenses light from a predetermined visual field region to form an image on the imaging unit;
   a lens driving unit that moves the zoom lens along an optical axis of the optical system; and
   a region setting unit that sets a fixed region in which a size of the object is maintained constant in the image displayed on the display unit, wherein
   the control unit drives the lens driving unit to move the zoom lens along the optical axis so that the size of the fixed region set by the area setting unit can be obtained.

7. The portable device according to claim 6, wherein
   the image is landscape-oriented, and
   the moving-state determining unit determines that the portable device is being moved when a lateral direction of the image is approximately the same as a horizontal direction of the portable device.

8. The portable device according to claim 1, further comprising:
   a display control unit that controls a display mode of the image displayed on the display unit, wherein
   the display unit includes:
   a first display unit that displays an image corresponding to the image data; and
   a second display unit that displays an image corresponding to the image data in a display area that is smaller than a display area of the first display unit, wherein
   the display control unit displays the image on at least one of the first display unit and the second display unit depending on the determination result of the moving-state determining unit.

9. The portable device according to claim 8, wherein
   the display control unit changes a content of operation information related to an operation instruction on an operation performed by the portable device, depending on the determination result of the moving-state determining unit, and displays the changed content on at least one of the first display unit and the second display unit.

10. The portable device according to claim 9, wherein
    the moving-state determining unit includes an acceleration sensor, and determines that the portable device is being moved when a cycle of change in acceleration in a vertical direction of the portable device and a cycle of change in acceleration in a horizontal direction of the portable device approximately match each other.

11. The portable device according to claim 10, wherein
    when the moving-state determining unit determines that the portable device is being moved, the display control unit displays the image on the first display unit, and
    when the moving-state determining unit determines that the portable device is not being moved, the display control unit displays the image on the second display unit.

12. The portable device according to claim 11, wherein
    when switching a display destination of the image from one to the other between the first display unit and the second display unit, the display control unit displays the image on both of the first display unit and the second display unit for a predetermined time.

13. The portable device according to claim 12, further comprising:
    an input unit that receives input of an instruction signal for giving an instruction to extend a display duration of the image on the first display unit, wherein
    when the display control unit switches the display destination of the image from the first display unit to the second display unit and if the instruction signal is input, the display control unit extends the display duration of the image displayed on the first display unit.

14. The portable device according to claim 13, wherein
    the display control unit displays a time taken before the display destination of the image is switched from one to the other between the first display unit and the second display unit, on one of the first display unit and the second display unit.

15. The portable device according to claim 14, wherein
    the display control unit displays switching information indicating that the display destination of the image is to be switched from one to the other between the first display unit and the second display unit, on one of the first display unit and the second display unit.

16. The portable device according to claim 15, wherein
    the display control unit changes the switching information step-by-step in a temporal sequence while superimposing the switching information onto the image.

17. The portable device according to claim 16, wherein
    the second display unit is detachably attached to the portable device, and functions as an eyepiece display unit that allows a user of the portable device to view the image with the user's eye brought closest thereto.

18. The portable device according to claim 17, wherein the image is laterally-oriented, and
the moving-state determining unit determines that the portable device is being moved when a lateral direction of the image is approximately the same as a horizontal direction of the portable device.

19. An operating method implemented by a portable device comprising an imaging unit that captures an image of an object and generates image data of the object, a configurable input unit, and a display unit that displays an image of the image data, the operating method comprising:
   determining a moving state of the portable device when the portable device is in an image capturing mode;
   selecting a configuration of the configurable input unit, depending on a determination result obtained at the determining; and
   receiving a manual photographer operation instruction input via the configurable input unit in the selected configuration.

20. A non-transitory computer-readable storage medium with an executable program stored thereon, wherein the program instructs a processor to perform:
   determining a moving state of the portable device when the portable device is in an image capturing mode;
   selecting a configuration of a configurable input unit, depending on a determination result obtained at the determining; and
   receiving a manual photographer operation instruction input via the configurable input unit in the selected configuration.

21. A portable device comprising:
   an imaging unit that captures an image of an object and generates image data of the object;
   a display unit that displays an image of the image data;
   a configurable input unit for receiving input of a photographer's operation instruction;
   a moving-state determining unit that determines a moving state of the portable device when the portable device is in an image capturing mode; and
   a control unit that changes a configuration of the configurable input unit, depending on a determination result of the moving-state determining unit.

* * * * *